(12) United States Patent
Shiozawa

(10) Patent No.: US 8,843,439 B2
(45) Date of Patent: Sep. 23, 2014

(54) COMPUTER PRODUCT, SERVER, AND SNAPSHOT COLLECTION METHOD

(75) Inventor: Kensuke Shiozawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 248 days.

(21) Appl. No.: 13/137,981

(22) Filed: Sep. 22, 2011

(65) Prior Publication Data

US 2012/0166389 A1 Jun. 28, 2012

(30) Foreign Application Priority Data

Dec. 27, 2010 (JP) ................................ 2010-290557

(51) Int. Cl.
*G06F 17/30* (2006.01)

(52) U.S. Cl.
CPC .............................. *G06F 17/30088* (2013.01)
USPC ............ 707/610; 707/623; 707/674; 709/232

(58) Field of Classification Search
USPC ............ 707/610, 623, 674; 709/230; 711/162
See application file for complete search history.

(56) References Cited

U.S. PATENT DOCUMENTS

| | | | |
|---|---|---|---|
| 8,364,648 B1 * | 1/2013 | Sim-Tang | ..................... 707/674 |
| 2003/0182301 A1 | 9/2003 | Patterson et al. | |
| 2006/0106878 A1 | 5/2006 | Shitomi et al. | |
| 2009/0063508 A1 | 3/2009 | Yamato et al. | |
| 2009/0271581 A1 * | 10/2009 | Hinrichs, Jr. | .................. 711/162 |
| 2011/0087792 A2 * | 4/2011 | Wayda et al. | ................. 709/230 |
| 2012/0054152 A1 * | 3/2012 | Adkins et al. | ................. 707/623 |

FOREIGN PATENT DOCUMENTS

| | | |
|---|---|---|
| JP | 11-120056 | 4/1999 |
| JP | 2004-038929 | 2/2004 |
| JP | 2006-146904 | 6/2006 |
| JP | 2009-053955 | 3/2009 |

\* cited by examiner

*Primary Examiner* — Belix M Ortiz Ditren
(74) *Attorney, Agent, or Firm* — Staas & Halsey LLP

(57) ABSTRACT

A non-transitory, computer-readable medium storing a program that causes a computer that controls data storage apparatuses respectively storing plural data, and a storing apparatus storing metadata that includes for each of the data, attribute information and storage location information, the process includes receiving a snapshot collection request for a given data group having specified attribute information; determining with respect to the data storage apparatuses and when the collection request is received, whether any of the data of the given data group is stored therein, based on the attribute information and the storage location information; and generating, with respect to each of the data storage apparatuses storing data of the given data group, a snapshot of the plural data stored therein, by controlling the data storage apparatus and further generating a snapshot of the metadata by controlling the storing apparatus.

17 Claims, 15 Drawing Sheets

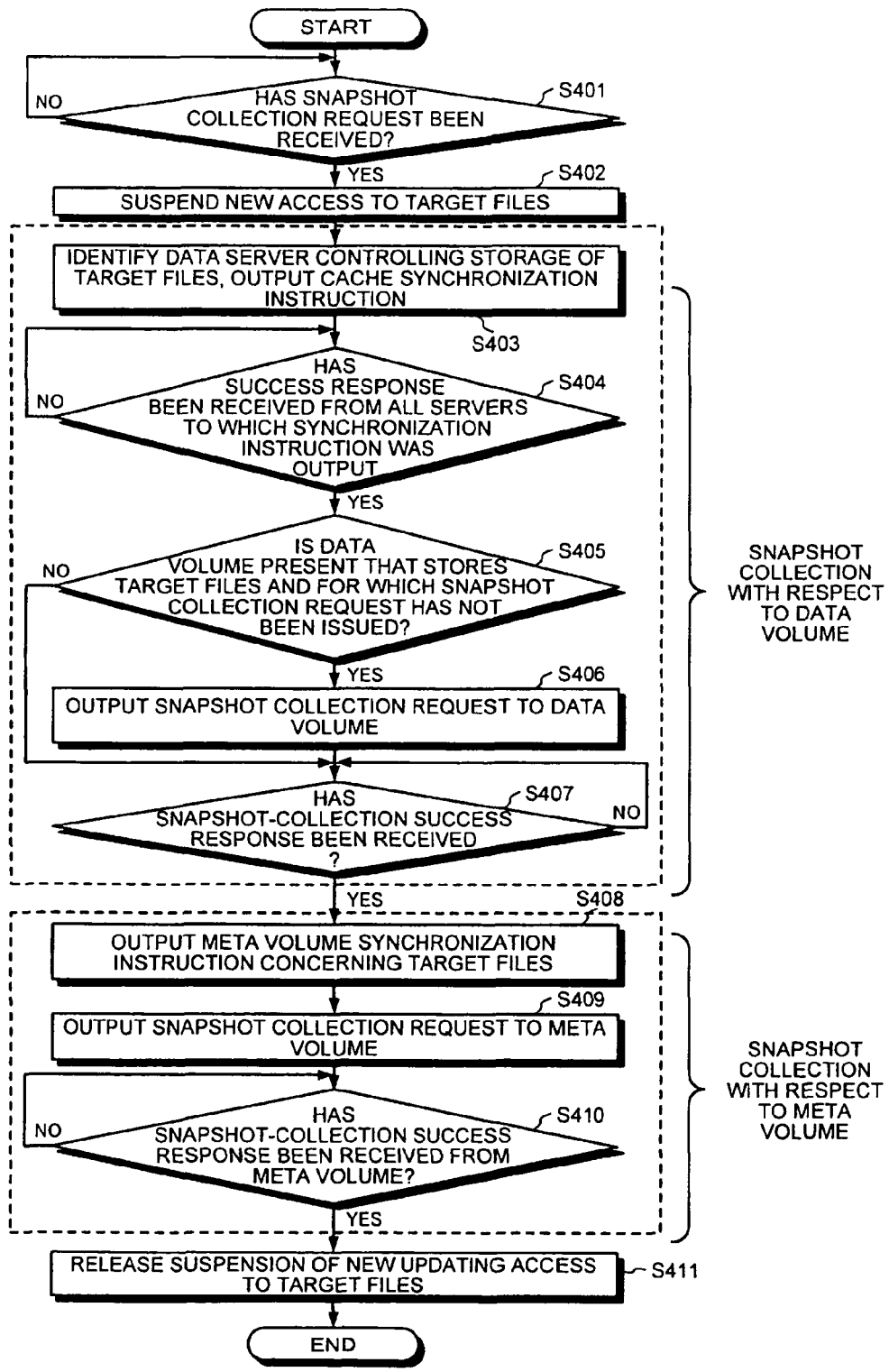

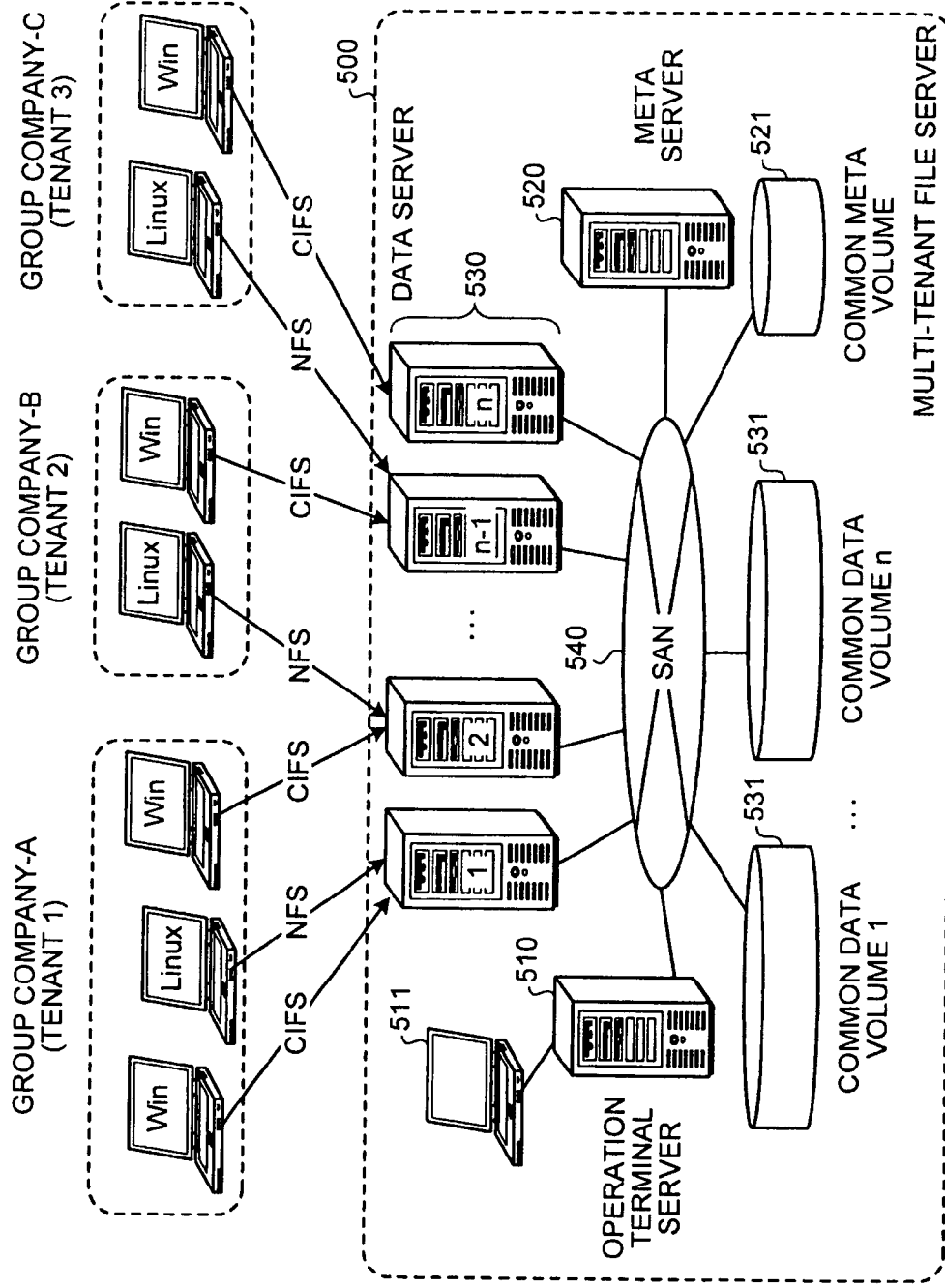

FIG.7

| TENANT ID | SNAPSHOT ID | CATEGORY | DEVICE PATH | ORIGINAL DEVICE PATH |
|---|---|---|---|---|
| 0 | 0 | META VOLUME | /dev/sda | |
| 0 | 0 | DATA VOLUME | /dev/sdb | |
| 0 | 0 | DATA VOLUME | /dev/sdc | |
| 0 | 0 | DATA VOLUME | /dev/sdd | |
| 1 | 1 | META VOLUME | /dev/sde | /dev/sda |
| 1 | 1 | DATA VOLUME | /dev/sdf | /dev/sdc |
| 1 | 1 | DATA VOLUME | /dev/sdg | /dev/sdd |
| 2 | 1 | META VOLUME | /dev/sdh | /dev/sda |
| 2 | 1 | DATA VOLUME | /dev/sdi | /dev/sdc |
| 1 | 1 | META VOLUME | /dev/sdj | /dev/sda |
| 1 | 1 | DATA VOLUME | /dev/sdk | /dev/sdc |
| 2 | 2 | META VOLUME | /dev/sdl | /dev/sda |
| 2 | 2 | DATA VOLUME | /dev/sdm | /dev/sdc |
| 2 | 2 | DATA VOLUME | /dev/sdn | /dev/sdd |

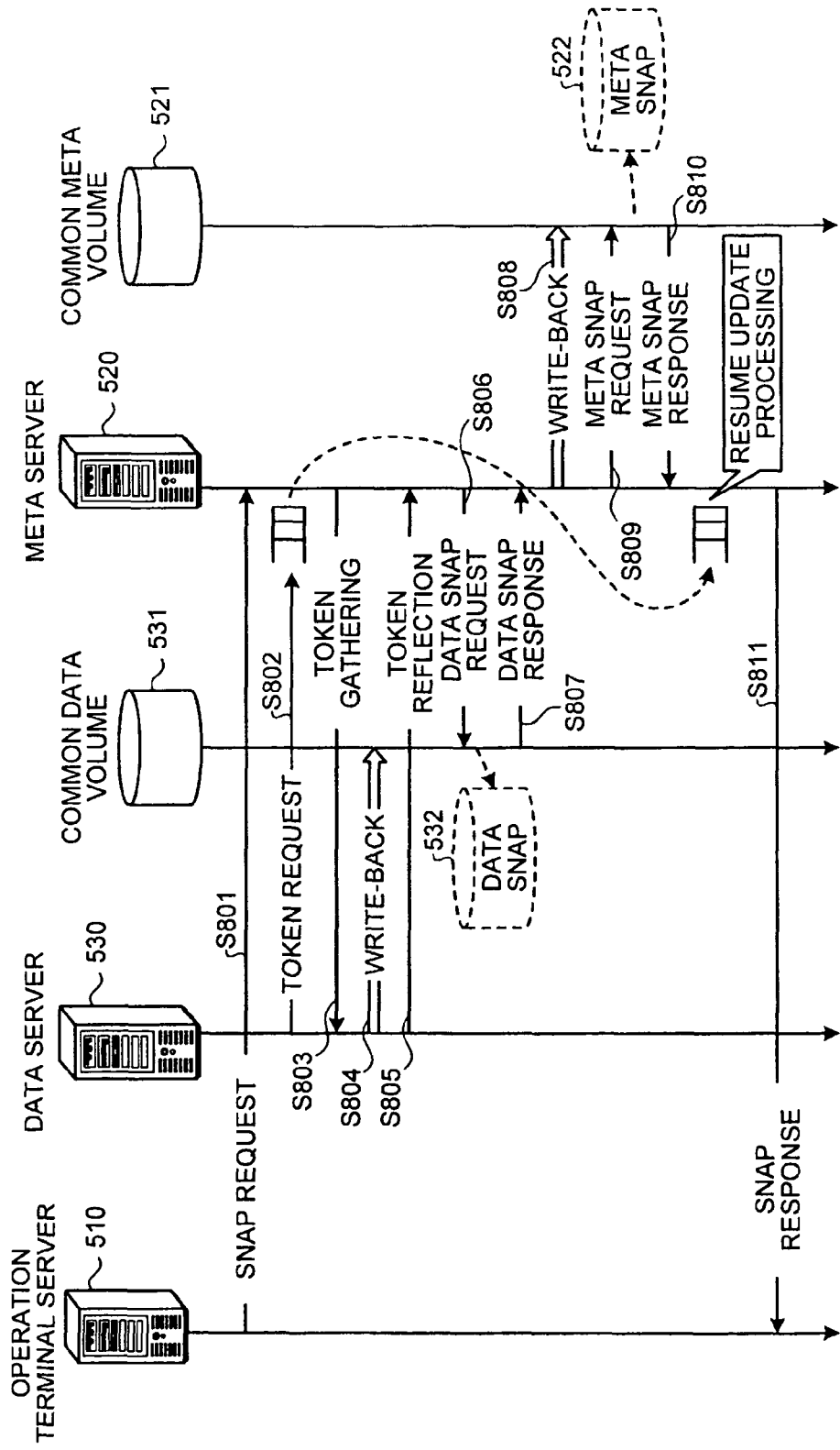

FIG.12

| TENANT ID | SNAPSHOT ID | CATEGORY | DEVICE PATH | ORIGINAL DEVICE PATH |
|---|---|---|---|---|
| 0 | 0 | META VOLUME | /dev/sda | |
| X | 3 | META VOLUME | /dev/sds | /dev/sda |
| X | 3 | DATA VOLUME | /dev/sdt | /dev/sdc |
| X | 3 | DATA VOLUME | /dev/sdu | /dev/sdd |

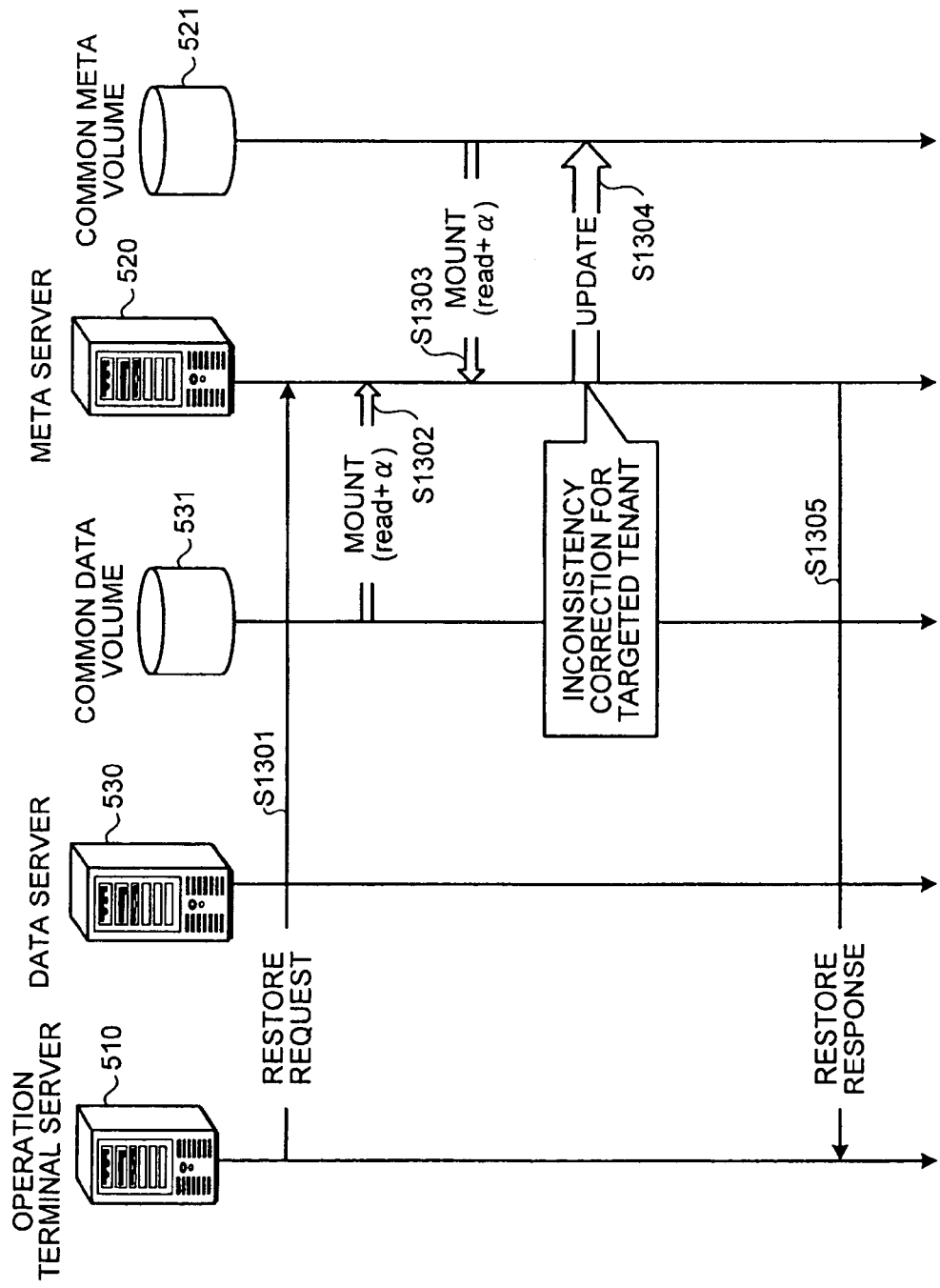

COMPUTER PRODUCT, SERVER, AND SNAPSHOT COLLECTION METHOD

CROSS-REFERENCE TO RELATED APPLICATIONS

This application is based upon and claims the benefit of priority of the prior Japanese Patent Application No. 2010-290557, filed on Dec. 27, 2010, the entire contents of which are incorporated herein by reference.

FIELD

The embodiment discussed herein is related to a server and snapshot collection.

BACKGROUND

Conventionally, the amount of data handled within a particular group, such as a business, university, municipality, etc., continues to increase. Adverse effects of increases in data volume at a business, for example, include an excessive amount of file servers, independent use of information by departments, and large increases in storage facility and administration costs.

Recently, as a measure against increases in data volume, storage consolidation technology is promising. One such embodiment is, for example, a file server that can be shared by multiple clients and is used at a data center. Here, a client is a user of an information technology (IT) system. Furthermore, since a client is called a tenant, a file server that can be shared may be called a multi-tenant file server.

A multi-tenant file server assumes utilization by an enormous number of tenants. Naturally, the number of users belonging to each tenant is enormous. Therefore, in a system using a multi-tenant file server, a huge storage capacity, high response performance, and throughput are demanded. As an example of configuration of a system that satisfies these conditions, a system uses data servers each having a different function, such as a system consisting of multiple data servers and a meta server.

A data server is a file server that controls the input/output (I/O) process of each file handled by each tenant. A meta server is a file server that manages metadata, which expresses the file identifying information (file name, file type, storage location information, etc.). A file server group having a file server function configured by multiple data servers and a meta server is called a cluster file server. If configuration is like a cluster file server, where data servers and the meta server are independent, the I/O processing load for each file can be distributed among the multiple data servers.

In a system that uses a cluster file server, system administration that reduces TCO is expected. For example, each of the data servers and the meta server as well are shared by multiple tenants, facilitating cost reductions by increasing the utilization efficiency of computing resources.

In the operation of a cluster file server, as a data protection, periodic backup processing is required. Technology adopted for implementing the backup processing is often a snapshot function, but disk images collected by the snapshot function cannot be utilized unless the images are in a consistent state.

Here, if a snapshot is collected, each file server performs a quiesce operation. In the quiesce operation, at each file server, new accesses are queued until either the write-backs of the dirty cache to disk, or the snapshot collection is completed. By performing the quiesce operation, each file server can preserve the consistency of the disk image collected as a snapshot. (For examples of conventional arts, refer to Japanese Laid-Open Patent Publication Nos. H11-120056, 2006-146904, 2004-38929, and 2009-53955.)

However, as described, with the multi-tenant servers, to accommodate an enormous number of users, the number of data servers and the cache capacity provided thereto also becomes huge. In other words, the amount of data that is to be subject to backup processing at each file server is also huge.

Further, when a snapshot is collected, all of the cache data held by all of the data servers is simply written back to a disk. Therefore, a problem arises in that at each file server, an enormous amount of overhead occurs related to the collection of a series of snapshots, including the quiesce operation.

Additionally, depending on the data type and system operation, among the tenants using the file servers, there may be some tenants who do not require snapshot collection. For tenants who do not require snapshot collection, periodic snapshot collection is meaningless. Furthermore, write-backs of the cache data to disk during the quiesce operation pose a problem of interfering with performance for tenants that do not require snapshot collection.

SUMMARY

According to an aspect of an embodiment, a computer-readable medium stores therein a snapshot collection program that causes a computer to execute a process. The computer is able to control plural data storage apparatuses respectively storing therein plural data, and a storing apparatus storing therein metadata that includes for each of the data, attribute information and storage location information indicating in which data storage apparatus the respective data is stored. The process includes receiving a snapshot collection request for a given data group having specified attribute information; determining with respect to each of the data storage apparatuses and when the collection request is received, whether any of the data of the given data group is stored therein, based on the attribute information and the storage location information of the metadata; and generating, with respect to each of the data storage apparatuses that has been determined to be storing data of the given data group, a snapshot of the plural data stored in the data storage apparatus, by controlling the data storage apparatus and further generating a snapshot of the metadata by controlling the storing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A is a flowchart of processing when a snapshot of a meta server is collected.

FIG. 5 is a schematic of an example of system configuration of an implementation example.

FIG. 7 is a data table depicting a configuration example of a volume configuration list.

FIG. 8 is a sequence diagram of an example of snapshot collection.

FIGS. 9, 10, 11, and 12 depict a snapshot collection procedure concerning tenant X.

FIG. 13 is a sequence diagram of an example of restoration processing that uses snapshots.

DESCRIPTION OF EMBODIMENTS

Preferred embodiments of the present invention will be explained with reference to the accompanying drawings. In the embodiments, with respect to files that are in the storage of a storage group and specified by attributes, if an attribute of a tenant, etc. is specified, rather than generating a snapshot for each file, storage that includes the specified file are narrowed down from the storage group and a snapshot is generated and collected for each storage that includes the specified file.

In other words, even if storage that includes the file specified by attribute includes a file that is not specified by the attribute, a snapshot that also includes the unspecified file is generated collectively for the storage as a unit. Consequently, a reduction of the overhead occurring when each attribute specified file is searched for and a snapshot is generated for each file, can be facilitated.

Figure 1A:
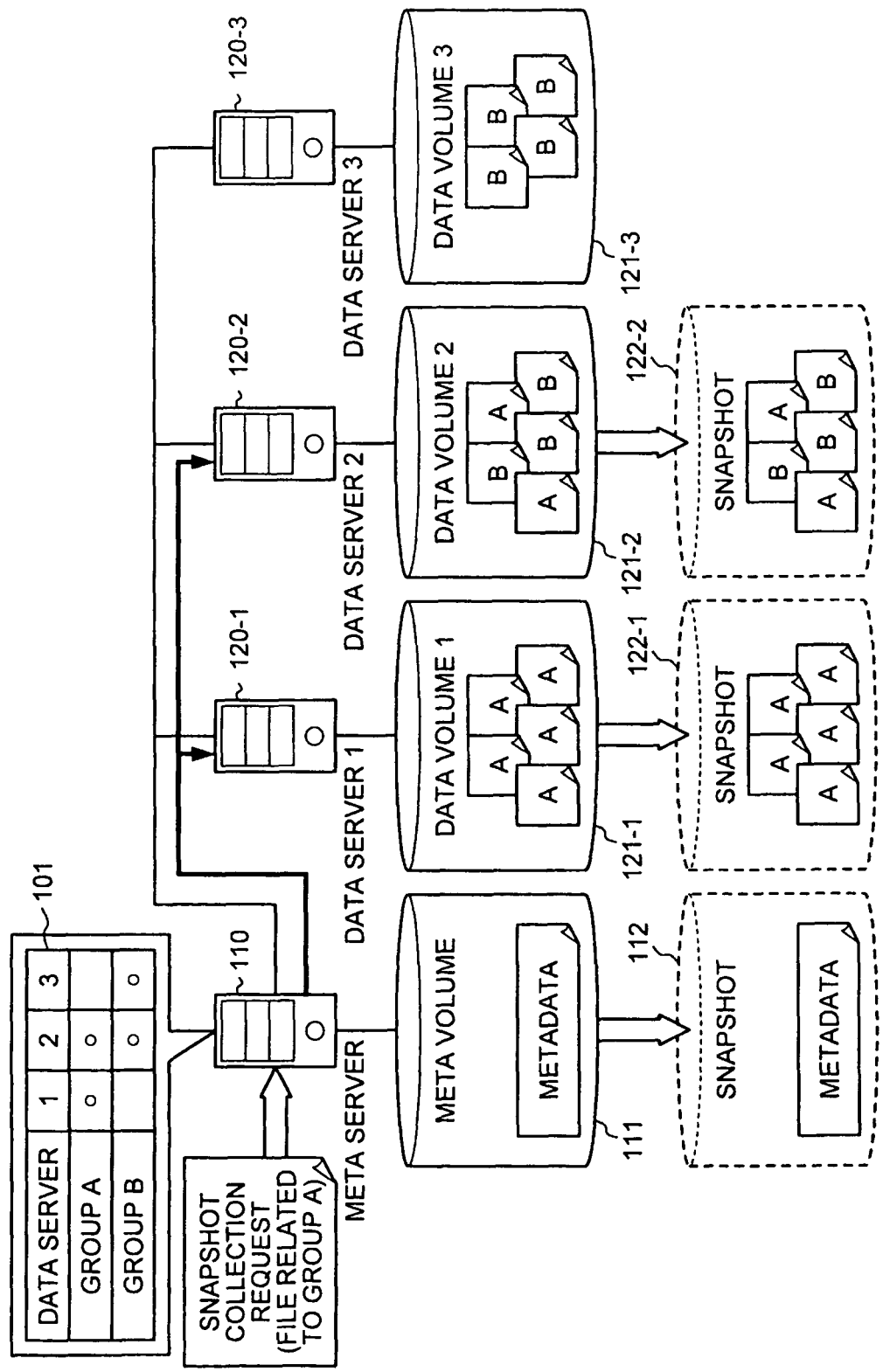
FIG. 1A is a schematic of an example of snapshot collection according to an embodiment.

FIG. 1A is a schematic of an example of snapshot collection according to an embodiment. In the present embodiment, as an example, one server among multiple file servers has a function of a meta server 110 that stores metadata 101. Metadata 101 is information that indicates the files stored by each of the file servers.

For example, the metadata 101 includes for each file, file identifying information, storage location information, and attribute information indicating the group. File identifying information is information for discriminating each file from other files and is configured by a file name, a file ID formed by particular character string or number, for example.

Location information is information indicating in which file server, each file is stored. The location information is configured by identification information indicating the file server to which a file is stored or is configured by address information indicating a path for accessing memory in a data volume 121 in which the file is actually stored, for example.

As described, in the metadata 101, file attribute information (e.g., group ID indicating the group, etc.) is correlated to enable identification of a file that matches a search condition, without the meta server 110 directly accessing the file. In the present embodiment, exclusive of the meta server 110, the other file servers are data storage apparatuses of the meta server 110 and respectively function as data servers 120-1 to 120-3 that store various types of files.

Each file server (the meta server 110 and the data servers 120-1 to 120-3) includes storage for storing files. Files that are acquired from an external device or that are newly created are stored in the corresponding storage of the file servers.

For simplicity in the description, the storage of the meta server 110, storing the metadata is referred to as meta volume 111. Further, the storage of the data servers 120-1 to 120-3, storing various types of files is referred to as data volumes 121-1 to 121-3.

There is no particular limit to the number of file servers. Although for simplicity in FIG. 1A, three data servers 120-1 to 120-3 are used in the description, N data servers 120-1 to 120-N can be used. Further, if N data servers 120-1 to 120-N are used, N data volumes 121-1 to 121-N storing the files are used. In other words, FIG. 1A depicts an example, where N=3.

The data servers 120-1 to 120-N are each used by users belonging to a group. For example, in the example depicted in FIG. 1A, a user belonging to group A and a user belonging to group B can use the data servers 120-1 to 120-3 and can store to the files in the data volumes 121-1 to 121-3, refer to/update the files stored in the data volumes 121-1 to 121-3, etc.

A group is attribute information that indicates a group of users that use common files. In the example of FIG. 1A, group A and group B are set as an example. Therefore, a file having attribute information set as group A is used by a user belonging to group A and a file having attribute information set as group B is used by a user belonging to group B.

For example, a user belonging to group A operates a client apparatus to use, among the files stored in the data volume 121, a file group having attribute information indicating group A. A file newly created by a user belonging to group A is stored to the data volume 121 and has attribute information indicating group A. Similarly, a user belonging to group B operates a client apparatus to use files having attribute information indicating group B. A file newly created by a user belonging to group B is stored to the data volume 121 and has attribute information indicating group B.

Further, a group can be appropriately set according to purpose. For example, as described for the conventional technology, provided the group is a unit expressing a set of users that use an IT system, such as tenants that represent clients, a business, a university, a municipality, etc., the group is not particularly limited (in an example described hereinafter, tenant is used in an example of group setting).

If a user belonging to any of the groups newly stores a file to any of the data servers 120-1 to 120-3, refers to a file already stored, etc., the meta server 110 may be used depending on the state of storage to the cache of the data server 120-1 to 120-3 storing the file to be accessed. For example, when a user attempts to access a file that is not cached to a data server 120 (any one of 120-1 to 120-3), the data server 120 requests the meta server 110 for cache authorization. On the other hand, when the user attempts to access a file cached to a data server 120 (any one of 120-1 to 120-3), the user issues to the data server 120, an access instruction concerning the cached file since the file has been cached. Metadata 101 that includes storage location information indicating the storage destination of files is stored in the meta volume 111 controlled by the meta server 110.

Therefore, by referring to the metadata 101, the meta server 110 can identify the data volume 121 storing the file requested by the user. Upon identifying the data volume 121 storing the file, the meta server 110 issues an instruction to access the file requested by the user, via the data server 120 that controls the identified data volume 121.

Further, when an instruction to create a new file is received from the user, the meta server 110 refers to the metadata 101 and determines the data volume 121 that is to store the new file. Subsequently, upon storing the new file to the data volume 121 via the corresponding the data server 120, the meta server 110 correlates and adds to the metadata 101, identification information identifying the new file (e.g., file name), attribute information (group A or group B), and storage location information indicating the storage destination (e.g., data server 120-1, etc.).

When a snapshot collection request targeting a specified group is received, the meta server 110 begins snapshot collection. The group is specified by the user who has requested the snapshot collection or by a higher system. Upon receiving the snapshot collection request targeting a specified group, the meta server 110 identifies the data volume 121 that is to be subject to the snapshot creation performed in units of volumes. The meta server 110 performs the snapshot collection by creating, in units of volumes, a snapshot of the identified data volume 121.

As an example, a case will described where, as depicted in FIG. 1A, files of group A and files of group B are stored in the data volume 121. If the meta server 110 receives a snapshot collection request targeting group A, the meta server 110 performs the snapshot collection on the data volumes 121-1 and 121-2, among the data volumes 121-1 to 121-3.

Although the data volume 121-2 stores files having group B attribute information, rather than determining for each file, whether to create a snapshot, the meta server 110 causes a snapshot to be created in units of volumes, i.e., causes a snapshot of the data volume 121-2 to be created, and collects the snapshot. Similarly, if the meta server 110 receives a snapshot collection request targeting group B, the meta server 110 causes a snapshot to be created in units of volumes, i.e., causes a snapshot to be created of the data volume 121-2, which stores files having attribute information for group A and files having attribute information for group B and further causes a snapshot of the data volume 121-3 to be created, which only stores files having attribute information for group B, and collects the snapshots.

As a result, if a data volume stores files having attribute information of the specified group, the meta server 110 performs the snapshot creation with respect to the data volume even if the data volume also stores files having attribute information of other groups.

Further, the meta server 110 excludes from the snapshot creation, data volumes that store only files having attribute information of other groups. Therefore, since it is not necessary to determine for each file stored in the data volumes 121, whether a snapshot is to be created for the file, snapshot collection having low overhead can be realized.

In describing the process of the meta server 110 sequentially, when a snapshot collection request targeting group A is received, first the meta server 110 refers to the metadata 101 and from among the data servers 120-1 to 120-3, identifies the data servers 120-1 and 120-2 that control the data volumes 121-1 and 121-2 that store the files having attribute information of group A.

The metadata 101 depicted in FIG. 1A simplistically depicts the attribute information and storage destination information that are included in the metadata stored in the meta volume 111 and that indicate the group that uses the respective files. The meta server 110 refers to the metadata 101 and is thereby able to identify among the data servers 120-1 to 120-3, the data servers 120-1 and 120-2 that store files having attribute information of group A.

Subsequently, the meta server 110 outputs a snapshot collection request to the identified data servers 120-1 and 120-2. The data servers 120-1 and 120-2 having received the snapshot collection request, perform the quiesce operation on the files having attribute information of group A, among all of the files. The quiesce operation is a preprocess to preserve the consistency of the snapshots. In the quiesce operation, for example, access to the files having attribute information of group A is suspended and a process of reflecting the updated contents, among the cache data, to the disk is performed.

Typically, when snapshot collection is performed in units of volumes, it is necessary to perform the quiesce operation on all of the files stored in the data volume 121, a large contributing factor of overhead. Since the meta server 110 narrows down the files to those having attribute information of group A to perform the quiesce operation, even if snapshot collection is performed with respect to a data volume further storing files having attribute information of a different group, compared to conventional snapshot collection, overhead can be expected to decrease since the files subject to the quiesce operation are limited to those for which the quiesce operation is necessary.

Subsequently, the data servers 120-1 and 120-2 respectively control the data volumes 121-1 and 121-2 and snapshots 122-1 and 122-2 are created of all of the files stored in the data volumes 121-1 and 121-2. The meta server 110 also performs the quiesce operation on the files having attribute information of group A in the metadata 101 and thereafter, controls the meta volume 111 and creates a snapshot 112.

Typically, the snapshots 112 and 122 are created in the storage. Therefore, in the example depicted in FIG. 1A, the snapshot 112 is created in the meta volume 111 and the snapshots 122 are created in the data volumes 121.

Figure 1B:
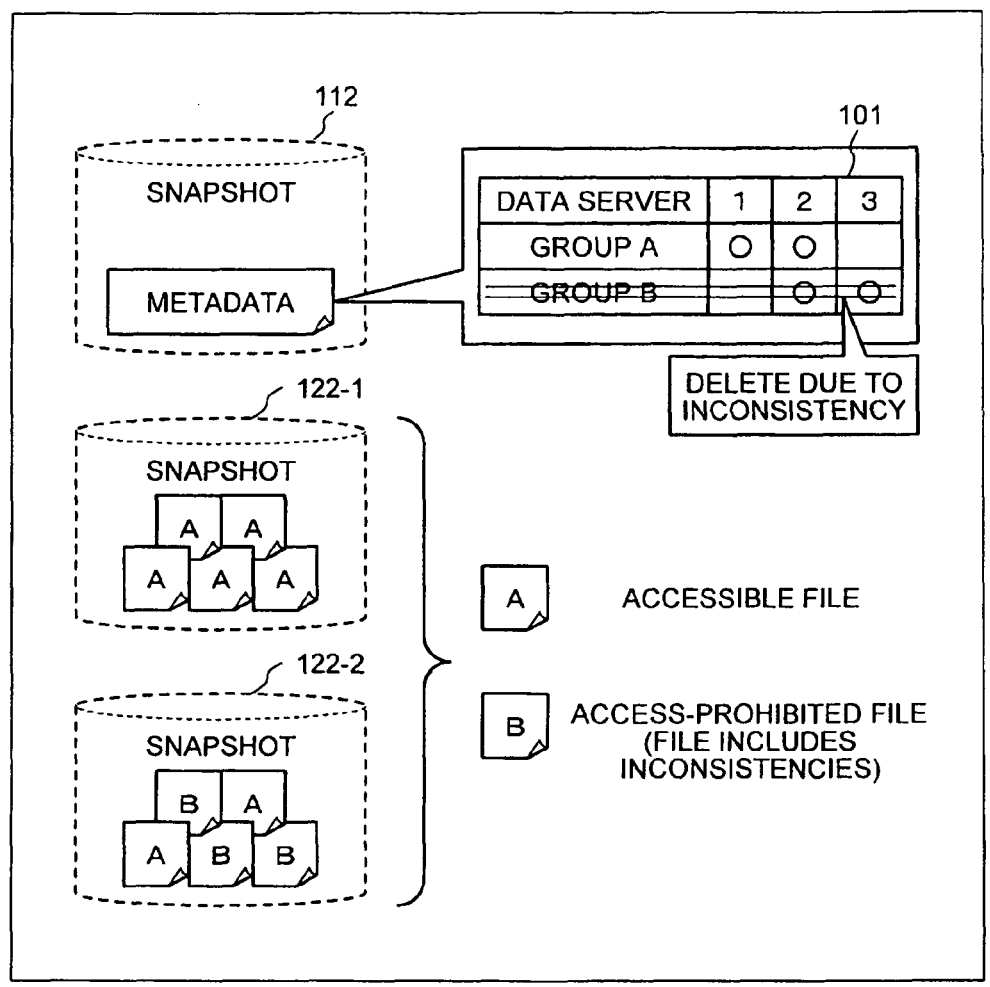
FIG. 1B is a schematic of an access range of a collected snapshot.

FIG. 1B is a schematic of the access range of a collected snapshot. As described with reference to FIG. 1A, in the present embodiment, even if a data volume has just one file having attribute information of group A and further stores files having attribute information of other groups, a snapshot (e.g., snapshot 122) of the volume unit is collected.

Further, in the metadata 101 stored in the meta volume 111, the storage location information and attribute information of various files having attribute information of a group other than group A are stored. Therefore, the snapshot 112 of the meta volume 111 also includes the storage location information and attribute information of files having attribute information of a group other than group A.

If the meta server 110 receives a snapshot collection request targeting group A, the meta server 110 performs the quiesce operation on the files having attribute information of group A. Therefore, among the files included in the snapshots 122, the files having attribute information of group A are corrected for consistency, whereby consistency is guaranteed.

However, the meta server 110 does not perform the quiesce operation on files having attribute information of a group other than group A (e.g., files having attribute information of group B). Therefore, among the files included in the snapshots 122, the files having attribute information of a group other than group A are not guaranteed for consistency and thus, the meta server 110 collects snapshots 122 that have inconsistencies.

Here, the meta server 110 controls the access range of the files included in the collected snapshots 112 and 122. For example, even if snapshot collection in units of volumes is performed on a data volume that stores files of both group A and group B, the meta server 110 performs an access control such that the user can access only the files having attribute information of group A. Therefore, the meta server 110 can provide the snapshots 112 and 122 that appear as though collection is narrowed to only the files having attribute information of group A.

For example, in FIG. 1B, since only groups A and B are set as attribute information, from the metadata 101 depicted in the snapshot 112, the meta server 110 deletes information indicating the storage destination of files having attribute information of group B. Therefore, the snapshot 112 is provided as a snapshot appearing to be of only the metadata 101 that indicates storage location information related to group A. Furthermore, concerning the files depicted in the snapshots 122, the meta server 110 allows access to the files having attribute information of group A and prohibits access to the files having attribute information of group B. Therefore, even the snapshot 122-2 having files of group A and files of group B, is provided as a snapshot appearing to be only of files of group A.

By establishing an access range for the collected snapshots 112 and 122, the meta server 110 limits the files for which the user can give access instructions, to the files having attribute information of group A. Therefore, among the files included in the collected snapshots 112 and 122, errant access to files having attribute information of a group other than group A (e.g., group B) can be prevented.

Since the meta server 110 prohibits access to files having attribute information of another group, when a snapshot is collected, even if files having attribute data of a different group is included in a data volume 121, a snapshot of all of the files is created and collected without consideration of the types of files stored in the data volume. In other words, when performing snapshot collection, the meta server 110 can eliminate processing for determining file attribute information and other such processing that increases overhead.

As described, in the present embodiment, the meta server 110 refers to the metadata 101 and is thereby able to identify what type of attribute information has been set for the files stored in the data volumes 121-1 to 121-3. Therefore, without directly accessing the data volumes 121-1 to 121-3, the meta server 110 can determine whether files having attribute information of the specified group is stored therein and can identify the data volumes (the data volumes 121-1 and 121-2) that are to be subject to the snapshot collection.

Subsequently, after performing the quiesce operation limited to the files having the attribute information of the specified group among the files stored in the identified data volumes 121-1 and 121-2, the meta server 110 creates, in units of volumes, the snapshots 122-1 and 122-2 of the data volume 121.

To prevent the errant use of files other than the files for which the snapshot collection request was received, the meta server 110 limits the files for which the user can issue an access instruction to the files forming the collected snapshot.

In this manner, the snapshot collection by the meta server 110 minimizes the processing necessary in performing the snapshot collection, e.g., the narrowing down of the data volumes 121-1 and 121-2 and the limited quiesce operation. Therefore, by implementing the present embodiment, compared to conventional technology, the processing volume when the snapshot is collected is reduced and overhead can be suppressed.

Hereinafter, a configuration and process details for implementing the snapshot collection according to the present embodiment will be described.

Figure 2:
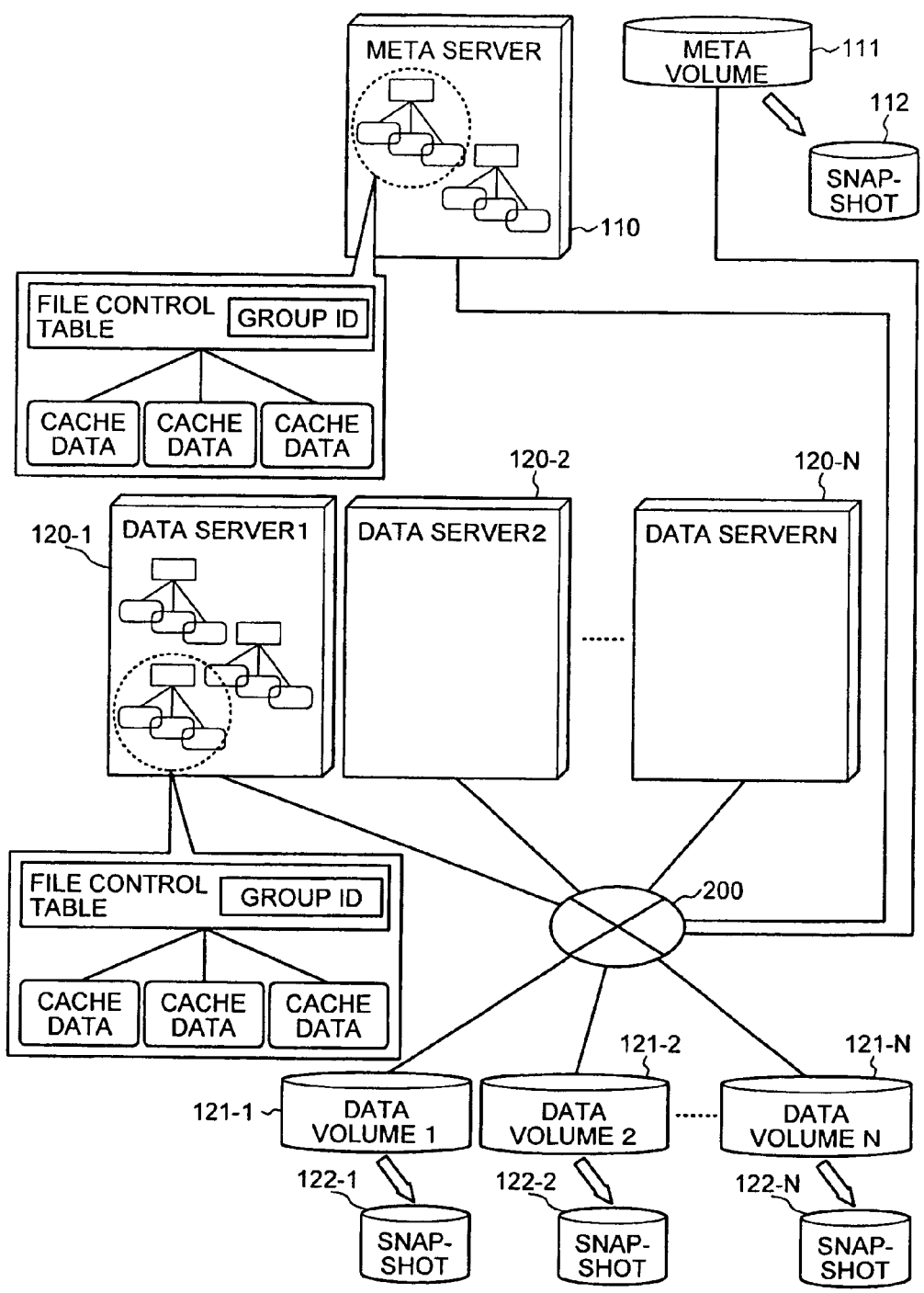
FIG. 2 is a schematic of an example of system configuration of a cluster file server.

FIG. 2 is a schematic of an example of system configuration of a cluster file server. The example of system configuration of the file server described with reference to FIG. 1A is, for example, provided as a cluster server that includes the meta server 110 and the data servers 120-1 to 120-N, as depicted in FIG. 2.

The meta server 110 and the data servers 120-1 to 120-N are not limited to a configuration of direct connection as depicted in FIG. 1A. The meta server 110 and the data servers 120-1 to 120-N may be respectively connected via a network 200. Similarly, a configuration where the meta volume 111 to which the meta server 110 stores the metadata 101 and the data volumes 121-1 to 121-N to which the data servers 120-1 to 120-N store various types of files are connected to the network 200 suffices.

The meta server 110 includes cache memory to increase the speed of access to the metadata 101 stored in the meta volume 111. Among the data included in the metadata 101, the meta server 110 can store as cache data to the cache memory, data having a high access frequency. The meta server 110 further has a file control table for controlling correspondence relations between the cache data stored in the cache memory and the metadata 101.

Similarly, the data servers 120-1 to 120-N respectively include cache memory to increase the speed of access to the files stored in the data volumes 121. Among the files, the data servers 120-1 to 120-N can store as cache data to the cache memory, files having high access frequency. The data servers 120-1 to 120-N further have a file control table for controlling correspondence relations between the cache data and the files.

If the contents of the cache data of the meta server 110 and the data servers 120 are updated and the snapshot collection is thus performed, inconsistency arises with the contents of the actual data stored in the meta volume 111 and the data volumes 121 (e.g., the metadata 101, the files used by the users (i.e., tenants), etc.). Hence, the meta server 110 has to perform synchronization processing of reflecting to the actual data, the updated contents of the cache data stored in the cache memory, when the snapshot is collected.

Typically, synchronization processing is performed periodically or when a given trigger occurs. In other words, when the snapshot collection request is received, there is a possibility that synchronization processing has not been completed for all of the cache data. Therefore, the meta server 110 has to complete the synchronization processing before collecting the snapshots 112 and 122.

Typical synchronization processing is executed with respect to all locations where the contents of the cache data are updated and inconsistency with the actual data arises. However, configuration may be such that the meta server 110 limits the synchronization processing to the files having attribute information of the group specified by the snapshot collection request. A procedure of the processing executed by the meta server 110 and the data servers 120 when a snapshot is collected will be described with reference to FIGS. 4A and 4B.

Figure 3:
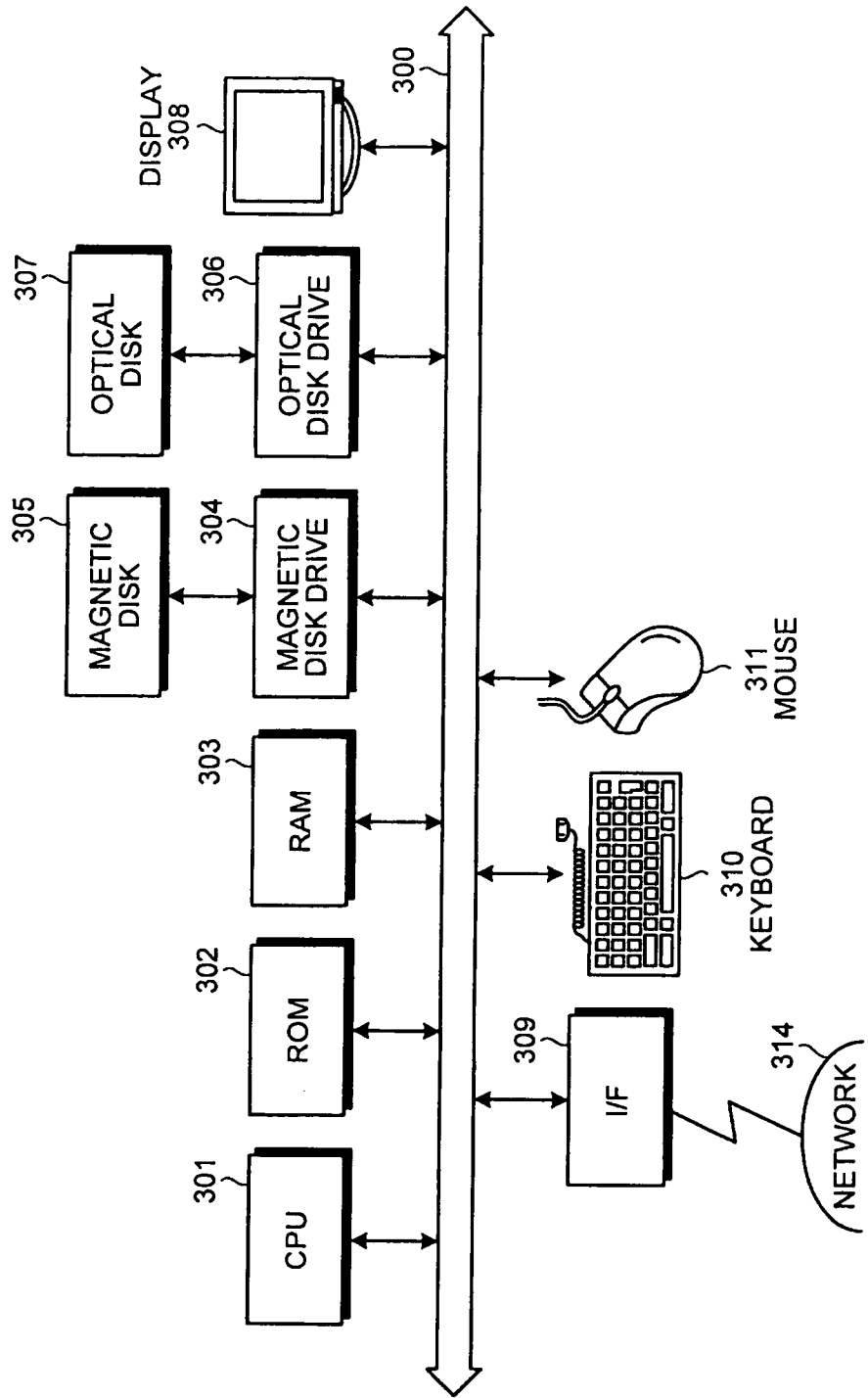
FIG. 3 is a block diagram of an example of hardware configuration of a file server.

FIG. 3 is a block diagram of an example of hardware configuration of a file server. In FIG. 3, each of the file servers (e.g., the meta server 110, the data servers 120) includes a central processing unit (CPU) 301, a read-only memory (ROM) 302, a random access memory (RAM) 303, a magnetic disk drive 304, a magnetic disk 305, an optical disk drive 306, an optical disk 307, a display 308, an interface (I/F) 309, a keyboard 310, and a mouse 311, respectively connected by a bus 300.

The CPU 301 governs overall control of the design support apparatus. In addition to a boot program, the ROM 302 stores therein programs such as a snapshot collecting program for implementing the snapshot collection according to the present embodiment. The contents of the processing by the snapshot collecting program when functioning as the meta server 110 and when functioning as a data server 120 differ, nonetheless, detailed description will be given with reference to FIGS. 4A and 4B.

The RAM 303 is used as a work area of the CPU 301. The magnetic disk drive 304, under the control of the CPU 301, controls the reading and writing of data with respect to the magnetic disk 305. The magnetic disk 305 stores therein data written under control of the magnetic disk drive 304.

The optical disk drive 306, under the control of the CPU 301, controls the reading and writing of data with respect to the optical disk 307. The optical disk 307 stores therein data written under control of the optical disk drive 306, the data being read by a computer. The file server may use the magnetic disk 305 and the optical disk 307 in place of the storage unit.

The display 308 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 308.

The I/F 309 is connected to a network 314 such as a local area network (LAN), a wide area network (WAN), and the Internet through a communication line and is connected to other apparatuses through the network 314. The I/F 309 administers an internal interface with the network 314 and controls the input/output of data from/to external apparatuses. For example, a modem or a LAN adaptor may be employed as the I/F 309.

The keyboard 310 includes, for example, keys for inputting letters, numerals, and various instructions and performs the input of data. Alternatively, a touch-panel-type input pad or numeric keypad, etc. may be adopted. The mouse 311 is used to move the cursor, select a region, or move and change the size of windows. A track ball or a joy stick may be adopted provided each respectively has a function similar to a pointing device.

The configuration described by FIG. 3 is one example and is a preferable configuration for the sake of convenience. Therefore, preparation of all of the hardware depicted in FIG. 3 is not always necessary. Furthermore, depending on whether the file server is functioning as the meta server 110 or as a data server 120, the details of the required minimum processing differs. Therefore, it suffices for each file server to have the minimum hardware required for implementing the processing desired by the user of the file server, including the CPU 301, the ROM 302, and the RAM 303.

FIG. 4A is a flowchart of processing when a snapshot of the meta server is collected. The flowchart depicted in FIG. 4A depicts the procedure from the reception of a snapshot collection request by the meta server 110; to the complete creation, in units of volumes, of the snapshots 122 of the data volumes 121 storing the target files that have attribute information specified by the snapshot collection request and the complete creation, in units of volumes, of the snapshot 112 of the meta volume 111 storing the metadata 101.

By executing of each of the processes depicted in FIG. 4A, the meta server 110 can create, in units of volumes, the snapshot 112 of the metadata 101 stored in the meta volume 111. At the same time, the meta server 110 can create, in units of volumes, the snapshots 122-1 and 122-2 of the data volumes 121-1 and 121-2 that store the target files and are narrowed down from among the data volumes 121-1 to 121-N.

As depicted in FIG. 4A, the meta server 110 determines whether a snapshot collection request has been received from the user (or a higher system) (step S401). As described with reference to FIG. 1A, attribute information that indicates the group (e.g., group A, group B) targeted for the snapshot collection is specified in the snapshot collection request.

The meta server 110 remains on standby until a snapshot collection request is received (step S401: NO). Upon receiving a snapshot collection request (step S401: YES), the meta server 110 suspends new updating accesses to target files, among accesses made to the data volumes 121-1 to 121-N (step S402).

For example, if group A is specified in the snapshot collection request, after the process at step S402, the meta server 110 refers to the metadata 101 and determines whether a new access thereto is requesting update processing of a target file.

If the meta server 110 determines that the new access is requesting update processing of a target file having attribute information of group A, the meta server 110 does not execute, but rather suspends the requested update processing. For the steps hereinafter as well, description is given assuming that the snapshot collection request specifies group A. Therefore, a target file means a file having attribute information of group A.

The meta server 110 begins processing to collect the snapshots 122-1 and 122-2 of the targeted data volumes 121-1 and 121-2. First, the meta server 110 refers to the metadata 101, identifies the data servers 120-1 and 120-2 controlling the storage of the target files, and outputs a cache synchronization instruction (step S403).

The meta server 110 identifies from the metadata 101, the target files having attribute information of group A and from the storage location information of the identified target files, further identifies the storage destinations thereof, i.e., the data volumes 121-1 and 121-2. Therefore, at step S403, among the data servers 121-1 to 121-3, the meta server 110 outputs the cache synchronization instruction to the data servers 120-1 and 120-2, which control the data volumes 121-1 and 121-2 storing the target files.

Next, the meta server 110 determines whether success responses concerning the cache synchronizations have been received from the data servers 120-1 and 120-2 (step S404). At the data servers 120-1 and 120-2, cache synchronization is performed with respect to the data volumes 121-1 and 121-2. The data servers 120-1 and 120-2 output success responses to the meta server 110 upon completion of the synchronization.

As described with respect to step S404, by receiving success responses from the data servers 120-1 and 120-2 to which the cache synchronization instructions were output, the meta server 110 can determine whether preparation enabling collection of the snapshots 122-1 and 122-2, which have been made consistent with respect to the data volumes 121-1 and 121-2, has been completed. The details of the processing related to the cache synchronization executed by the data servers 120-1 and 120-2 will be described with reference to FIG. 4B.

The meta server 110 remains on standby until success responses are received from the data servers 120-1 and 120-2 (step S404: NO). Upon receiving the success responses from the data servers 120-1 and 120-2 (step S404: YES), the meta server 110 determines whether the target files are stored in the data volumes 121-1 and 121-2 controlled by the data servers 120-1 and 120-2 and a snapshot collection instruction has yet to be issued (step S405). If the target files are stored therein and a snapshot collection instruction has yet to be issued, it means that the data volumes 121-1 and 121-2 have yet to be subjected to the snapshot collection processes at step S401 and at subsequent steps.

If the meta server 110, for example, determines that the target files are stored in the data volume 121-1 and 121-2, and a snapshot collection instruction has yet to be issued (step S405: YES), the meta server 110 outputs a snapshot collection instruction to the data volumes 121-1 and 121-2 (step S406). If a snapshot collection instruction for the data volumes 121-1 and 121-2 has been issued (step S405: NO), the meta server 110 omits the process at step S406, and proceeds to step S407.

After outputting a snapshot collection instruction to the data volumes 121-1 and 121-2, the meta server 110 determines whether snapshot-collection success responses have been received from the data volumes 121-1 and 121-2 (step S407). Here, if the meta server 110 receives a success response from the data volumes 121-1 and 121-2, respectively, the meta server 110 determines that success responses have been received.

The meta server 110 remains on standby until snapshot collection success responses are received (step S407: NO). Upon receiving the success responses (step S407: YES), the meta server 110 determines that snapshot collection with respect to the data volumes 121-1 and 121-2 has been completed and transitions to snapshot collection with respect to the meta volume 111.

First, the meta server 110 outputs to the meta volume 111, a synchronization instruction to eliminate inconsistencies from the target files in the metadata 101 (step S408). At step S408, for example, if the meta server 110 stores dirty cache (cache having contents that have been updated) related to the target files, the meta server 110 synchronizes the dirty cache with the metadata 101 stored in the meta volume 111.

Next, the meta server 110 outputs a snapshot collection instruction to the meta volume 111 (step S409). After outputting the snapshot collection instruction to the meta volume 111, the meta server 110 determines whether a snapshot-collection success response has been received from the meta volume 111 (step S410).

The meta server 110 remains on standby until a snapshot-collection success response is received (step S410: NO). Upon receiving the success response (step S410: YES), the meta server 110 determines that snapshot collection with respect to the meta volume 111 has been completed. The meta server 110 releases the suspension of new updating accesses implemented at step S402 (step S411), ending the processing.

Figure 4B:
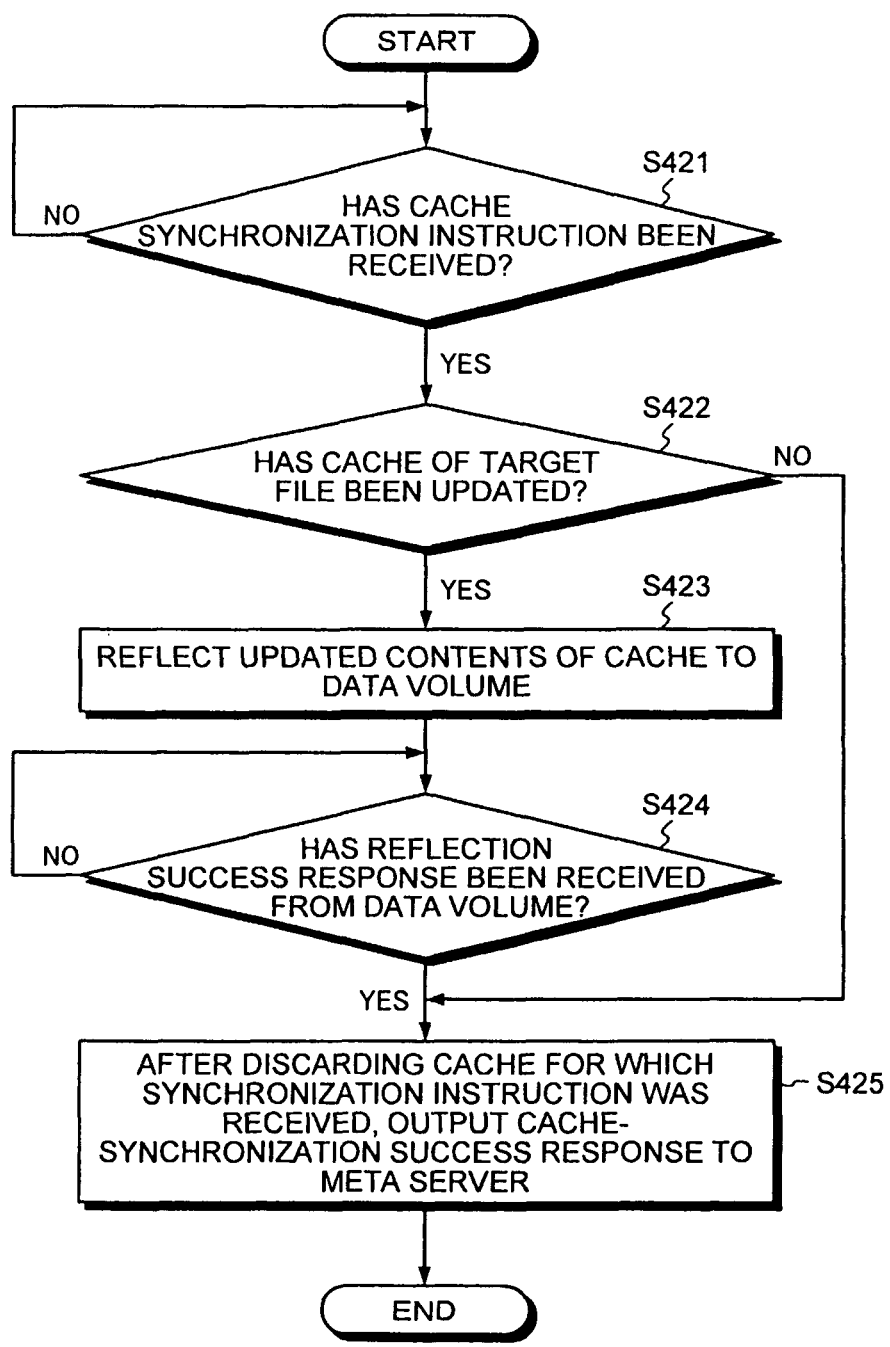
FIG. 4B is a flowchart of an example of snapshot collection performed by a data server.

FIG. 4B is a flowchart of an example of snapshot collection performed by a data server. The flowchart depicted in FIG. 4B depicts operations respectively performed by the data servers 120-1 and 120-2 that receive the cache synchronization instruction output at step S403 in FIG. 4A.

As depicted in the flowchart in FIG. 4B, first, the data servers 120-1 and 120-2 determine whether a cache synchronization instruction has been received from the meta server 110 (step S421). The cache synchronization instruction from the meta server 110 is the cache synchronization instruction output from the meta server 110 at step S403 described in FIG. 4A.

By the process at step S403, the meta server 110 outputs a cache synchronization instruction to the data servers 120-1 and 120-2 controlling the data volumes 121-1 and 121-2 that store the target files. Therefore, at step S421, since the data volumes 121-1 and 121-2 controlled by the data servers 120-1 and 120-2 that have received the cache synchronization instruction, store the target files, the data volumes 121-1 and 121-2 become the targets of the snapshot collection. Hereinafter, although processing by the data server 120-1 will be described, the data server 120-2 performs similar processing.

The data server 120-1 remains on standby until a cache synchronization instruction is received (step S421: NO). Upon receiving a cache synchronization instruction (step S421: YES), the data server 120-1 determines whether cache contents corresponding to the contents stored in a target file have been updated (step S422).

If the data server 120-1 determines that the cache contents have been updated (step S422: YES), the data server 120-1 reflects the updated cache contents to the target files stored in the data volume 121-1 (step S423). Further, upon completing reflection of the updated contents to the target files set according to the synchronization instruction from the data server 120-1, the data volume 121-1 outputs a reflection success response to the data server 120-1.

Therefore, upon completing the process at step S423, the data server 120-1 determines whether a reflection success response has been received from the data volume 121-1 (step S424), and remains on standby until a reflection success response is received from data volume 121-1 (step S424: NO). Upon receiving a reflection success response (step S424: YES) and after discarding (purging) the cache for which a synchronization instruction was received, the data server 120-1 outputs a cache-synchronization success response to the meta server 110 (step S425), ending the processing.

If the data server 120-1 determines that cache concerning a target file has not been update (step S422: NO), the contents of the target files stored in the cache and the contents of the target files stored in the data volume 121-1 are synchronized. Hence, if the cache of a target file has not been updated, the data server 120-1 performs the process at step S425, without performing the reflection processes at steps S423 and S424.

By the output of the success response from the data server 120-1, the meta server 110 is able to determine that creation of a snapshot of the data volume 121-1 is possible. Similarly, by the output of a success response by the data server 120-2, the meta server 110 is able to determine that a snapshot of the data volume 121-2 is possible.

As described, in the present embodiment, even for a data volume, such as the data volume 121-2, storing the target files as well as other files, the meta server 110 performs control to create a snapshot in units of volumes. In this manner, the meta server 110 uses the metadata 101 to be able to narrow down the data volumes 121-1 to 121-N, to the data volumes 121-1 and 121-2 storing the target files and requiring snapshot collection, by only a simple determination process having a low processing load.

By narrowing down the data volumes 121-1 to 121-N, to the data volumes 121-1 and 121-2, the disk images created by a single snapshot collection request are reduced. Further, for data volumes such as the data volume 121-2 storing files having different attribute information, the meta server 110 limits the files subject to the quiesce operation, to the target files, whereby the volume of data cache to be written-back to the disk can be significantly reduced. Therefore, the overhead occurring with a series of snapshot collections can be reduced.

Furthermore, in the case of the present embodiment, since each received snapshot collection request pertains to a single group, snapshot collection of groups for which snapshot collection is not necessary and of data volumes such as the data volume 121-3 storing only files having attribute information of groups for which collection is not necessary, can be prevented. Therefore, meaningless processing (such as the creation of snapshots of unnecessary files) that occurs when snapshots of all of the data volumes 121-1 to 121-N is created without group discrimination, can be reduced. Interference in performance can also be reduced for tenants not requiring snapshot collection.

In FIGS. 1A and 2, although an example was described where multiple file servers are separated as the meta server 110 and the data servers 120-1 to 120-N, if a function enabling independent control of the meta volume 111 and the data volumes 121-1 to 121-N, respectively, is provided, implementation may be by a single file server. When a snapshot is collected by a single file server, the cache synchronization at the meta server 110 and the cache synchronizations at the data volumes 121-1 to 121-N are executed as processes of the same apparatus.

For example, in FIG. 4A, step S403 depicts a process where the meta server 110 outputs a synchronization instruction to the data servers 120-1 and 120-2; and step S404 depicts a process where the meta server 110 receives a success response from the data servers 120-1 and 120-2, respectively. In the case of a single file server, the processes at steps S403 and S404 are replaced by the communication of signals between functional units of the same apparatus.

Further, in FIG. 2, although the connection of the meta server 110 and the meta volume 111, and the connections of the data server 120-1 to 120-N and the data volumes 121-1 to 121-N are implemented via the same network 200, configuration is not limited hereto. For example, the meta volume 111 may be connected to the meta server 110 alone, and the data servers 120-1 to 120-N may be connected to the corresponding data volume 121-1 to 121-N alone. If the meta server 110 and the data volumes 121-1 to 121-N are not directly connected, snapshot collection requests from the meta server 110 to the data volumes 121-1 to 121-N are executed through the data servers 120-1 to 120-N.

For example, in FIG. 4A, step S406 depicts a process where the meta server 110 outputs a snapshot collection request to the data volume 121-1; and step S407 depicts a process where the meta server 110 receives a success response from the data volume 121-1. Here, the process at step S406 is replaced by a process where the meta server 110 outputs a snapshot collection instruction to the data volume 121-1 through the data server 120-1. Similarly, the process at step S407 is replaced by a process where the meta server 110 receives, through the data server 120-1, a success response output from the data volume 121-1.

The network 200, for example, may be a network, such as a LAN or a storage area network (SAN), adopted according to intended use, environment, etc.

The snapshot 112 created by the meta volume 111 is stored in the meta volume 111 and the snapshots 122-1 and 122-2 created by the data volumes 121-1 and 121-2 are stored in the respective data volumes 121, however, configuration may be such that storage specialized for snapshot storage for recovery, at an external device, is prepared and the snapshots 112 and 122-1 and 122-2 are stored thereto.

FIG. 5 is a schematic of an example of system configuration of an implementation example. With reference to FIG. 5, an implementation example will be described where the snapshot processing according to the present embodiment is applied to a typical file server system.

In the implementation example, multiple clients operating various types of OS are connected to client file systems of a cluster file system. Further, in the implementation example, the overall system depicted in FIG. 5 is referred to as a multi-tenant file server 500. A file server is assumed that integrates protocol servers of a network file system (NFS), which is a file-sharing system used by a Unix (registered trademark) system (as depicted in FIG. 5, a Unix-compliant Linux (registered trademark) system is often employed), and a common internet file system (CIFS), which is a file-sharing system used by a Windows (registered trademark) system.

The multi-tenant file server 500 includes an operation terminal server 510, a meta server 520, a common meta volume 521, data servers 530, and common data volumes 531. Apparatuses included in the multi-tenant file server 500 will be described in detail.

The operation terminal server 510 is a server having a function of outputting requests related to snapshots and of receiving success responses related to snapshot collection. For example, the operation terminal server 510 issues to the meta server 520, snapshot collection commands (SNAP request) and settings (RESTORE request) for referring to a collected snapshot. In the case of the multi-tenant file server 500, the operation terminal server 510 is operated by a manager client apparatus 511.

The meta server 520 is a server having a function of controlling access to the common meta volume 521, which is storage shared by multiple tenants. For example, the meta server 520 updates/refers to various types of data configuring the metadata stored in the common meta volume 521. Further, the meta server 520 services metadata update/reference requests from the data servers 530. By issuing tokens (data transmission privileges), the meta server 520 controls exclusion processing (allowing or prohibiting access to tenants operating clients) that is related to the access of the data servers 530 from the clients.

The common meta volume 521 is a server having a function of storing various types of data related to metadata. For example, the common meta volume 521 stores metadata (e.g., name information and attribute information of each file) for each file, area control data of the common data volumes 531, and update log data of the data above.

The common meta volume 521 can be accessed by the meta server 520 via a SAN 540. As can be seen with a large number of recent enterprise redundant arrays of inexpensive disks (RAID) systems, the common meta volume 521 has a snapshot function for the entire volume. Therefore, the common meta volume 521 can create a snapshot of the metadata (METASNAP) in response to an instruction from the meta server 520.

The data servers 530 are servers that have a function of controlling access to the common data volumes 531, which are storage shared by the tenants. For example, in conjunction with the meta server 520, the data servers 530 update/refer to the metadata stored in the common meta volume 521. The data servers 530 further update/refer to files in the common data volumes 531; and in response to a file access request from a user application, access various types of files stored in the common data volumes 531.

The common data volumes 531 are storage that has a function of storing various types of data related to files. For example, the common data volumes 531 store file data (actual data of files).

The common data volumes 531 can be accessed by the data servers 530 and the meta server 520, via the SAN 540. As seen in a large number of recent enterprise RAID systems, the common data volumes 531 have a snapshot function for the entire volume.

In the system configuration depicted in FIG. 5, the meta server 520 implements a function that corresponds to the meta server 110 depicted in FIG. 2. The common meta volume 521 implements a function that corresponds to the meta volume 111 depicted in FIG. 2. The data servers 530 implement a function that corresponds to the data servers 120-1 to 120-N depicted in FIG. 2 and the common data volumes 531 implement a function that corresponds to the data volumes 121-1 to 121-N depicted in FIG. 2.

The snapshot collection processing concerning the meta server 110 and the data servers 120-1 to 120-N (refer to FIGS. 4A and 4B) may be implemented by one file server and similarly, a portion of the functions of the apparatuses depicted in FIG. 5 can be consolidated to a single apparatus. For example, the operation terminal server 510, the meta server 520, and the data servers 530 may be consolidated into one apparatus; and the meta server 520 and the data servers 530 may consolidated into one apparatus.

In the multi-tenant file server 500, a user application operating on a client apparatus used by the tenants issues through a LAN to the data servers 520, an I/O request concerning various types of file data. As for the type of protocol of the I/O request, typically, when the client is operating under a Unix environment, NFS is often used, which is a network file system protocol standardized for an Unix environment. When a client is operating under a Windows environment, CIFS is often used, which is a Windows network file system protocol standardized for an Windows environment.

The data servers 530, which control the interface with a user application, have to preliminarily acquire an access token related to targeted data, in order to access the file data in the common data volumes 531. An access token can be acquired from the meta server 520. Since a known technology (for example, refer to Japanese Patent Nos. 3783992 and 3866448) is used for exclusion control of access using an access token between the common data volumes 531 and the data servers 530, description thereof is omitted herein.

In the system, which uses the multi-tenant file server 500 of the present implementation example, mutually unrelated client apparatuses are grouped into units of tenants (different business enterprises, different departments within a business enterprise, etc.). The multi-tenant file server 500 is shared by multiple users via user applications on the clients in each of the tenants. Further, the multi-tenant file server 500 can control access, by a tenant, to the files of another tenant (and vise versa).

The multi-tenant file server 500 can conceal the existence of file objects belonging to other tenants. Therefore, each of the clients can use the multi-tenant file server 500 as if the users belonging to the client exclusively possess the multi-tenant file server 500.

Figure 6:
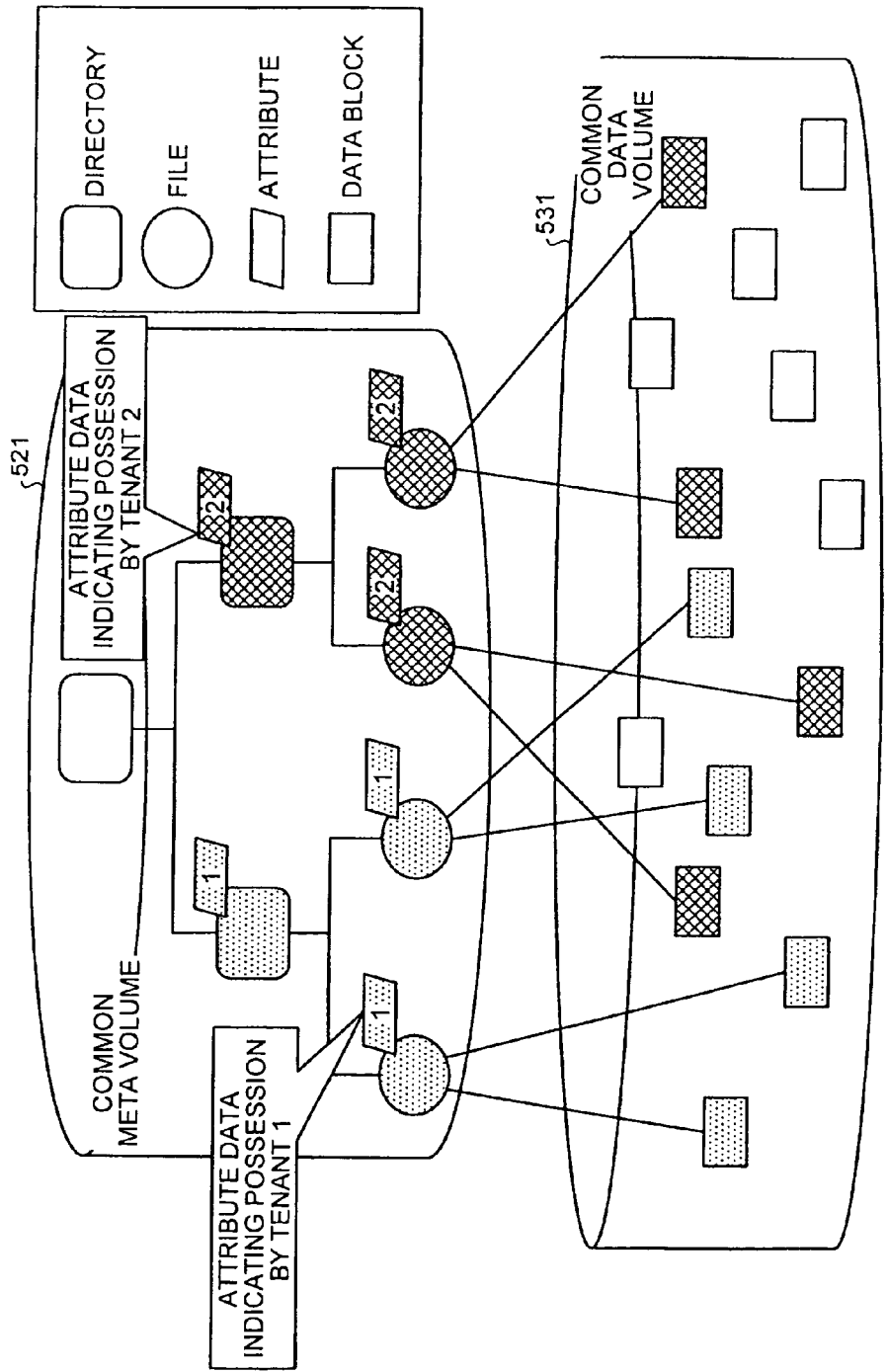
FIG. 6 is a schematic of the relation between a common meta volume and common data volumes.

FIG. 6 is a schematic of the relation between the common meta volume and the common data volumes. In the multi-tenant file server 500, the meta server 520 and the data servers 530 have a role in managing the correspondence relation between file data and the tenants possessing the files. As depicted in FIG. 6, in the implementation example and as an example of a management scheme, identification information of the tenants possessing the file data, is managed as file attribute information (one type of information that includes metadata).

Attribute information such as that depicted in FIG. 6 is cached together with other attribute information (e.g., file type, proprietor information), including that on the data server 530 side. As an alternative method of managing the correspondence relation between file data and tenants, configuration may be such that with the attribute information as it is, names spaces of the file data form separate subdirectories for each tenant.

FIG. 7 is a data table depicting a configuration example of a volume configuration list. In the multi-tenant file server 500, configuration information of the files and snapshots is controlled by a volume configuration list 700 having fields such as those depicted in the example in FIG. 7. The volume configuration list 700, usually, is stored in the meta server 520. By using the volume configuration list 700, even in the case of system operation requests such as mounts or if the meta server 520 performs accesses for SNAP request processing and RESTORE request processing, the existence of such can be concealed to the user application.

The volume configuration list 700 indicates by tenant IDs and snapshot IDs, tenants targeted for snapshot collection, snapshot versions, etc. Therefore, the meta server 520, by referring to the volume configuration list 700, can identify changes (e.g., data volume deletions or additions, etc.) in the targeted files at the time of snapshot collection.

For example, a record group 701 of the volume configuration list 700 has 0 set as the tenant ID and the snapshot ID. In other words, the record group 701 indicates the existing volume data.

A record group 702 of the volume configuration list 700 has 1 set as the tenant ID and the snapshot ID. In other words, the record group 702 indicates version 1 snapshot data used by the user application of tenant 1. In the user application of tenant 1, since the device path /dev/sdb data is not targeted for a snapshot, the data is not included in the record group 702 of the version 1 snapshot.

A record group 703 of the volume configuration list 700 has 2 set as the tenant ID and 1 set as the snapshot ID. In other words, the record group 703 indicates version 1 snapshot data used by the user application of tenant 2. The record group 703 indicates a state where after the snapshots indicated by the records of the record group 702 are collected, the device path /dev/sdd data is deleted.

A record group 704 of the volume configuration list 700 has 2 set as the tenant ID and the snapshot ID. In other words, the record group 704 indicates version 2 snapshot data used by the user application of tenant 2. The record group 704 indicates a state where after snapshots indicated by the records of the record group 703 are collected, the device path /dev/sdd data is newly added.

The multi-tenant file server 500, upon collecting a snapshot in response to a snapshot collection request, records in detail to the volume configuration list 700, the contents of the collection. Therefore, the multi-tenant file server 500 can identify from what type of data, a collected snapshot is formed.

FIG. 8 is a sequence diagram of an example of snapshot collection. The sequence example depicted in FIG. 8 represents a procedure of collecting a snapshot for a specified tenant, from the data servers 530 storing data used by multiple tenants. Hereinafter, the contents of the process at each step will be described in detail.

<SNAP Request: Step S801>

The operation terminal server 510 requests the meta server 520 for snapshot collection concerning a specified tenant (here, as an example, description will be given concerning tenant X). For example, the operation terminal server 510 issues a SNAP request message and transmits the SNAP request message to the meta server 520. Attribute information identifying tenant X is appended to the SNAP request. If the operation terminal server 510 is shared by multiple tenants, it is preferable for some type of security control to be performed preventing operations and management personnel of a given tenant to illicitly perform an operation of another tenant.

<Token Request: Step S802>

Upon receiving the SNAP request transmitted at step S801, the meta server 520 suspends updating-related token requests that are from the data servers 530 and concern the file data belonging to tenant X. The suspended state implemented at step S802 continues until the completion of step S810 described hereinafter.

By the process at step S802, the data servers 530 are able to control updating access to files that do not belong to tenant X. Irrespective of an updating-related token request, if a file does not belong to tenant X and even if access occurs, snapshot collection is not affected. Therefore, at step S802 and thereafter, access to file data that does not belong to tenant X is normally permitted.

With respect to files belonging to tenant X as well, the meta server 520 can normally perform the processes at step S802 and thereafter to respond to a token request related to a reference-related token (e.g., a data reference token, an attribute reference token, etc.). Although configuration may be such that similar to the updating-related token requests, reference-related token requests are suspended, however, since the data snap of the data volume to be collected at step S806, described hereinafter, is not related to the updating of file data belonging to tenant X, the result is the same as not suspending reference-related token requests.

Concerning update requests (e.g., directory generation requests, file attribute changing requests, etc.), normal processing can be performed up to the meta volume snapshot process at step S809 described hereinafter. However, accompanying the creation of new file data, to omit a new token request, a new file data token may be simultaneously requested. Even if such a request is made, the meta server 520 limits the response to the appending of a reference-related token.

<Token Gathering: Step S803>

The meta server 520 searches the meta volume (or a volume cached to memory) for the file data at step S801 and belonging to tenant X. The meta server 520 gathers from the data servers 530, all of the retrieved updating-related tokens.

By the process at step S803, the data server 530 is able to control updating access to the files data belonging to tenant X, similar to step S802. Access to file data that does not belong to tenant X is normally permitted and therefore, tokens for file data that does not belong to tenant X are not particularly gathered.

<Write-Back: Step S804>

According to the tokens gathered at step S803, the data servers 530 perform write-back (write-back to the common data volumes 531) of the file data that belongs to tenant X.

<Token Reflection: Step S805>

Upon completion of the write-back at step S804, the data server 530 reflects to the metadata of the common meta volume 521, the write-back contents by the token to the meta server 520.

<Data SNAP Request: Step S806>

Upon completion of the process at step S805, the meta server 520 instructs all of the common data volumes 531 storing file folders that belong to tenant X specified at step S801 to collect DATA SNAPs (data volume snapshots) 532.

Upon receiving responses to the DATA SNAP 532 collection instruction, the meta server 520 records the response results to the volume configuration list 700. The DATA SNAP request is not necessarily issued to all of the common data volumes 531 controlled by the data servers 530. Of course, a portion of the common data volumes 531 may not be storing file data belonging to tenant X.

Thus, before and after reception of the DATA SNAP request issued at step S806, file data I/O for tenants other than tenant X may continue to with respect to the common data volumes 531. However, the multi-tenant file server 500 performs appropriate exclusion control such that DATA SNAP 532 consistency is maintained.

<DATA SNAP Response: Step S807>

The meta server 520 receives the DATA SNAPs 532 transmitted from the common data volumes 531 in response to the DATA SNAP request at step S806.

<Write-Back: Step S808>

According to the DATA SNAPs 532, which are responses at step S807, the meta server 520 performs write-back (to the common meta volume 521) of the metadata for the file data belonging to tenant X.

<META SNAP Request: Step S809>

Once the meta server 520 suspends all I/O process requests to the common meta volume 521, the meta server 520 instructs the common meta volume 521 to collect a META SNAP (snapshot of meta volume storing metadata) 522.

At step S809, the meta server 520 further suspends update requests (e.g., MKDIR requests, CREATE requests, etc.) for objects unrelated to tenant X. This suspension is for obtaining META SNAP 522 consistency with respect to the common meta volume 521. The common meta volume 521 further includes data that is not necessarily separated according to tenant, such as super blocks. Therefore, there are cases where update requests for objects unrelated to tenant X have to be suspended to maintain consistency.

<META SNAP Response: Step S810>

Upon receiving a response to the META SNAP request at step S809, the meta server 520 records an entry in the volume configuration list 700. The meta server 520 resumes the I/O processing that was suspended and transitions to the process at step S811.

<SNAP Response: Step S811>

Finally, the meta server 520 resumes the token request processing that was suspended by the process at step S802. The meta server 520 informs the operation terminal server 510 (which issued the SNAP request at step S801) of successful completion, ending the processing.

In the sequence described, the SNAP request is not necessarily a synchronized remote procedure call (RPC) and may be implemented by process completion CALLBACK to the operation terminal server 510 or by process completion polling by the operation terminal server 510.

FIGS. 9 to 12 depict a snapshot collection procedure concerning tenant X. With reference to FIGS. 9 to 12, the sequence of how snapshots related to tenant X are collected by the sequence described in FIG. 8 will be further described.

(1) Reception of Snapshot Collection Request

Figure 9:
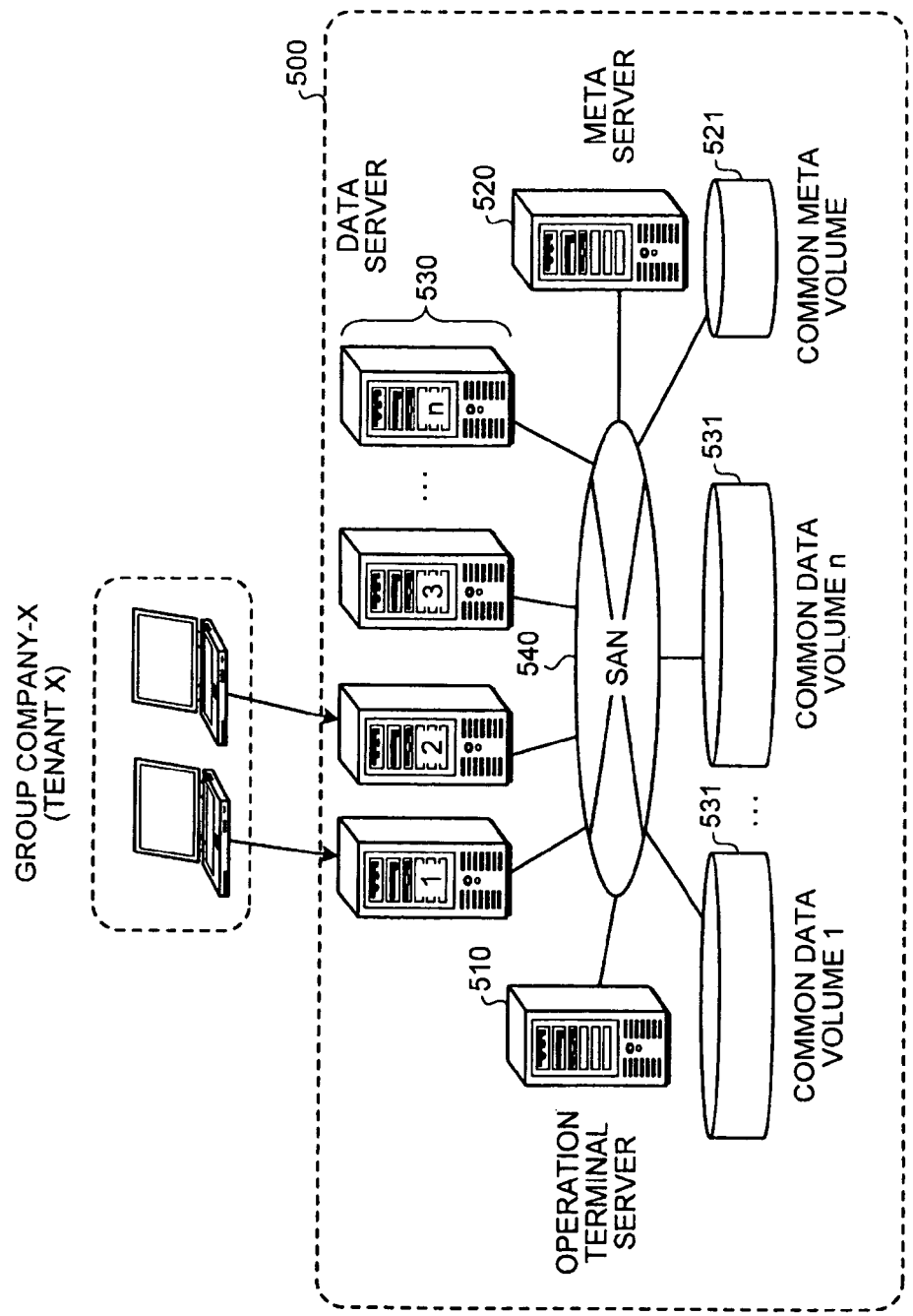

With reference to FIG. 9 reception of a snapshot collection request concerning tenant X will be described. In FIG. 9, the operation terminal server 510 receives a SNAP request concerning tenant X. As depicted in FIG. 9, among the data servers 530, tenant X accesses the data servers 530 "1" and "2" and uses various types of file data.

(2) Specification of Files Targeted for Snapshot Collection

Figure 10:
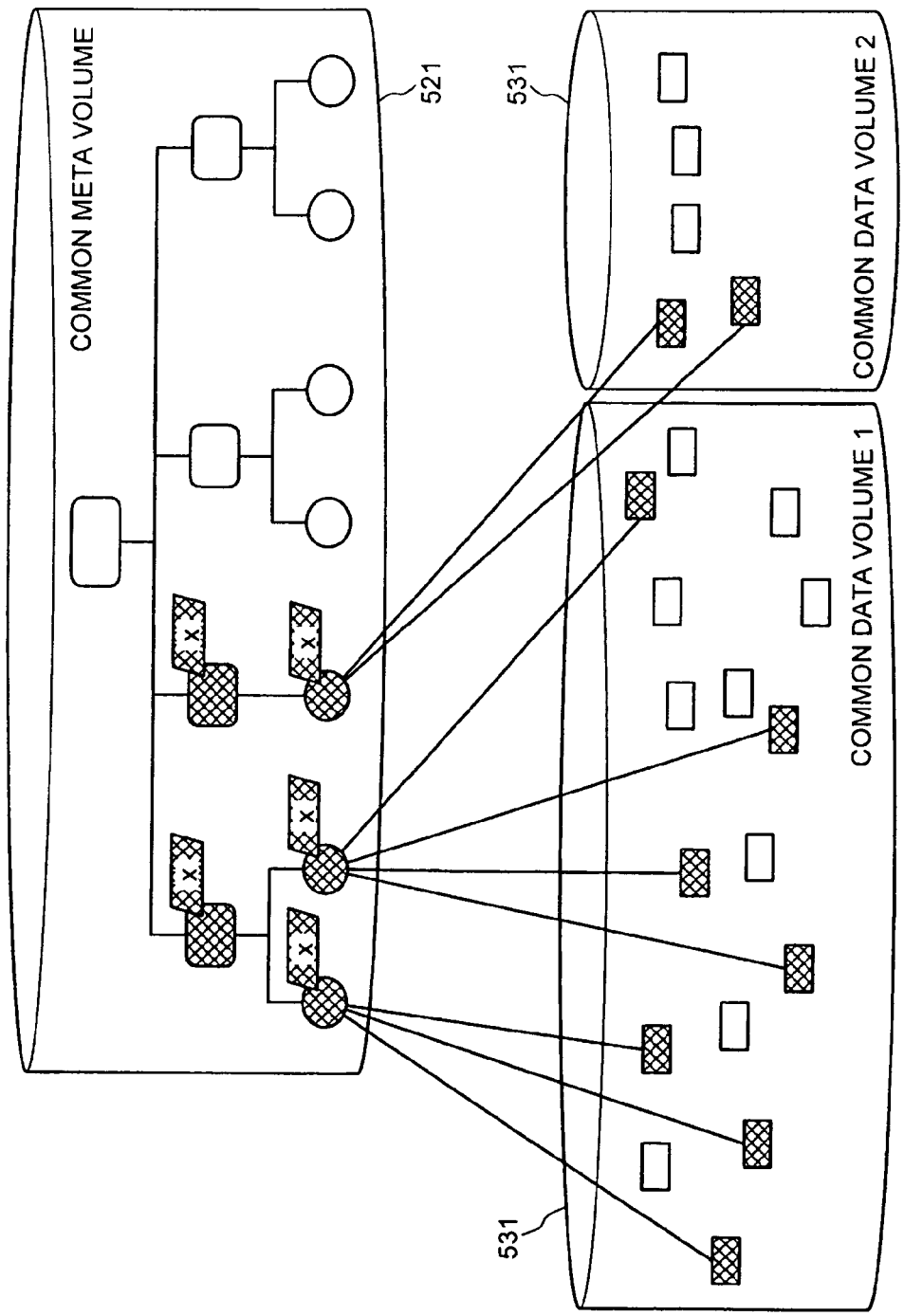

With reference to FIG. 10, the specification of files targeted for snapshot collection related to tenant X will be described. As depicted in FIG. 10, in responding to the SNAP request concerning tenant X, the meta server 520 refers to the metadata stored in the common meta volume 521 and among the common data volumes 531, identifies the common data volumes 531 storing the target files set by the attribute information of tenant X. Therefore, the two common data volumes 531 corresponding to the data servers 530 "1" and "2" among the data servers 530 are identified as snapshot collection targets.

(3) Snapshot Generation

Figure 11:
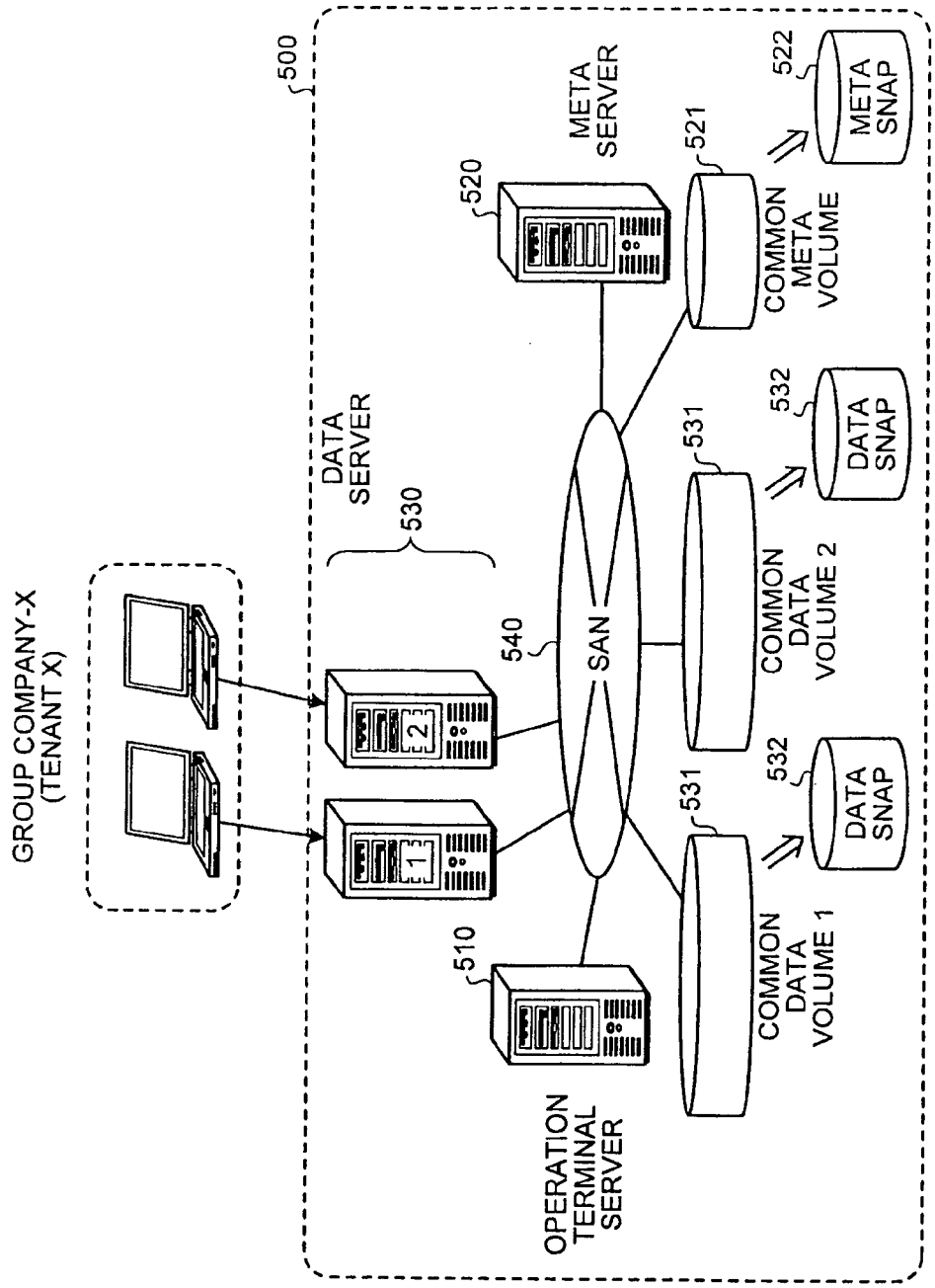

With reference to FIG. 11, the generation of a snapshot of a common data volume 531 storing the target files set by the attribute information of tenant X will be described. When the data servers 530 controlling the target files set by the attribute information of tenant X are identified, the data servers 530 "1" and "2" control the common data volumes 531 "1" and "2" storing the target files set by the attribute information of and generate the DATA SNAPs 532 of the common data volumes 531 storing the target files set by the attribute information of tenant X. Thereafter, the meta server 520 controls the common meta volume 521 and generates the META SNAP 522.

(4) Updating of Volume Configuration List

Finally, with reference to FIG. 12, updating of the volume configuration list 700 after the collection of snapshots concerning tenant X. As depicted in FIG. 12, the meta server 520 records to the volume configuration list 700, a record group 1000 of the current snapshots (e.g., snapshot ID=3) concerning tenant X.

FIG. 13 is a sequence diagram of an example of restoration processing that uses snapshots. With reference to FIG. 13, restoration processing for enabling access instructions by a user belonging to tenant X, concerning newly collected snapshots related to tenant X. In FIG. 13, in the system configuration of the multi-tenant file server 500, a RESTORE request from the operation terminal server 510 to the meta server 520 is a trigger and the message contents thereof will be described.

<RESTORE Request: Step S1301>

The operation terminal server 510 outputs a RESTORE request to the meta server 520. The RESTORE request is a signal instructing restoration of snapshots collected for tenant X by the processing depicted in FIG. 8. Attribute information that identifies tenant X and specifies the snapshots to be subject to the restoration processing, and volume identification information (V) of the restoration target are appended to the RESTORE request.

<Mount: Steps S1302, S1303>

The meta server 520 mounts the META SNAP 522 and the DATA SNAP 532 that are specified by the RESTORE request at step S1301 and include the volume identification information (V) for tenant X. The meta server 520 further manages, in the volume configuration list 700, a list of the META SNAPs 522 that include the specified snapshots. The meta server 520 sends a response indicating an error if a tenant ID or a snapshot ID that is not subject to management, i.e., not a tenant registered in the volume configuration list 700, is provided.

<Updating: Step S1304>

In addition to the META SNAP 522 mounted at step S1303, if there is another data volume that is registered besides that of the DATA SNAP 532 mounted at step S1302, the meta server 520 treats the other data volume as being forcibly deleted (may be actually deleted or the address may be erased disabling access). The DATA SNAP 532 of the common data volume 531 is specialized for the storage of tenant X file data and thus, the consistency thereof is corrected by the process at step S1304.

<RESTORE Response: Step S1305>

The meta server 520 sends to the operation terminal server 510 that issued the RESTORE request at step S1301, a response indicating restoration. The meta server 520 further resumes accepting access requests concerning the snapshots (DATA SNAP 532 and META SNAP 522) restored by the processes at step S1302 to S1304. The acceptance of an access request is determined by the type of access and is further limited to the file data belonging to tenant X.

The limited access described allows discrepancy between the META SNAP 522 and the DATA SNAP 532 related to tenants other than tenant X for which snapshots are collected and controls requests concerning files that are affected by the discrepancies.

As described, according to the embodiment, snapshots of storage storing file data having specified attribute information can be created on a unit basis, whereby the collection of requested snapshots can be realized. Therefore, a narrowing down of storage to be subject to snapshot collection can be achieved by making a simple determination. Therefore, a disk image generated by one snapshot collection can be drastically reduced. Further, the amount of data cache for write-back to the disk for quiesce operation can also be drastically reduced. Therefore, the overhead occurring for the collection of a series of snapshots can be reduced.

In the embodiment, during snapshot collection, concerning storage for which the generation of a snapshot is not desired or storage that stores files for which snapshot generation is not necessary, the generation of a snapshot can be avoided. Therefore, the generation of unnecessary storage snapshots that arises when snapshot collection generates snapshots targeting all data, can be reduced. Interference in performance for tenants not requiring snapshot generation can be prevented.

In the embodiment, when a snapshot collection request is received, quiesce operation which is a contributing factor of overhead, is performed with respect to only files for which consistency must be maintained. Therefore, overhead is reduced and for files that do not require the collection of consistent snapshot, access control can be avoided, enabling normal operation to be provided.

In the embodiment, when access to a collected snapshot occurs, the access range can be controlled to allow access to only the files having attribute information of the specified group. In other words, among the files included in the snapshot, only the files having attribute information of the specified group are permitted to be accessed and access to other files is prohibited.

For a file for which access is prohibited, consistency is not guaranteed because suspension and synchronization are implemented by the quiesce operation before snapshot generation. Therefore, by limiting the access range of the snapshots, even if the user of the snapshots issues an access instruction concerning a file that errantly includes inconsistencies, reference of the errant file can be prevented.

The snapshot collection method described in the present embodiment may be implemented by executing a prepared program on a computer such as a personal computer and a workstation. The program is stored on a computer-readable medium such as a hard disk, a flexible disk, a CD-ROM, an MO, and a DVD, read out from the medium, and executed by the computer. The program may be distributed through a network such as the Internet. However, the computer-readable medium does not include a transitory medium such as a propagation signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory, computer-readable medium storing therein a snapshot collection program that causes a computer to execute a process, wherein the computer is able to control a plurality of data storage apparatuses respectively storing therein a plurality of data, and a storing apparatus storing therein metadata that includes, for each of the data, attribute information and storage location information indicating in which data storage apparatus the respective data is stored, the process comprising:

receiving a snapshot collection request for a given group of the data having specified attribute information;

determining, with respect to each of the data storage apparatuses, whether any of data of the given group is stored therein based on the attribute information and the storage location information of the metadata when the collection request is received;

generating, with respect to each of the data storage apparatuses that has been determined to be storing data of the given group, a snapshot of all of the plurality of data stored in the data storage apparatus and including the data of the given group and other data without performing quiesce operation on the other data, and generating a snapshot of the metadata; and setting access permission for only the data of the given group in the snapshot by deleting from the metadata, information indicating location of the other data.

2. The non-transitory, computer-readable medium according to claim 1, the process further comprising:

suspending access to the data of the given group after the collection request is received; and releasing suspension of access to the data of the given group after generation of the snapshot of the data and the snapshot of the metadata.

3. The non-transitory, computer-readable medium according to claim 2, wherein the suspending includes suspending access to the data upon completion of any access to the data of the given group in progress before the reception of the collection request.

4. The non-transitory, computer-readable medium according to claim 2, wherein the suspending includes suspending, among accesses occurring after the reception of the collection request, only the accesses for updating the data of the given group.

5. The non-transitory, computer-readable medium according to claim 1, the process further comprising:

synchronizing the stored data of the given group and the data of the given group stored in a first cache memory that temporarily stores the data of the given group stored in the data storage apparatus with respect a data storage apparatus that has been determined to be storing data of the given group, the first-synchronizing being performed; and synchronizing the metadata stored in the second cache memory and the metadata stored in the storing apparatus that represents the attribute information and the storage location information of the data of the given group after completion of the synchronizing of the stored data of the given group and the data of the given group stored in a first cache memory, wherein the generating includes generating the snapshots of the pluralities of data and generating the snapshot of the metadata, after completion of the second synchronizing.

6. The non-transitory, computer-readable medium according to claim 1, the process further comprising erasing the attribute information and the storage location information that are included in the snapshot of the metadata and for data that are not in the given group.

7. A computer that controls a plurality of data storage apparatuses respectively storing therein a data group, and a storing apparatus storing therein metadata that includes, for each data of the data group, attribute information and storage location information indicating in which data storage apparatus the respective data is stored, the computer comprising:

a receiving unit that receives a snapshot collection request for a given data group having specified attribute information;

a determining unit that, with respect to each of the data storage apparatuses, determines whether any of the data of the given data group is stored therein when the snapshot collection request is received, based on the attribute information and the storage location information of the metadata;

a generating unit that, with respect to each of the data storage apparatuses that has been determined to be storing data of the given data group, generates a snapshot of all of the plurality of data stored in the data storage apparatus and including the data of the given group and other data without performing quiesce operation on the other data, and generates a snapshot of the metadata; and a setting unit that sets access permission for only the data of the given group in the snapshot by deleting from the metadata, information indicating location of the other data.

8. The computer according to claim 7, the process further comprising:

a suspending unit that suspends access to the data of the given data group after the collection request is received; and a releasing unit that releases suspension of access to the data of the given data group after generation of the snapshot of the data and the snapshot of the metadata.

9. The computer according to claim 8, wherein the suspending units suspends access upon completion of any access to the data of the given data group in progress before the reception of the collection request.

10. The computer according to claim 8, wherein the suspending unit, among accesses occurring after the reception of the collection request, suspends only the accesses for updating the data of the given data group.

11. The computer according to claim 8, the process further comprising:

a first synchronizing unit that, with respect a data storage apparatus that has been determined to be storing data of the given data group, synchronizes the stored data of the given data group and the data of the given data group accumulated in a first cache memory that temporarily accumulates the data of the given data group stored in the data storage apparatus, the first synchronizing unit performing synchronization when the data of the given data group has accumulated in the first cache memory and by controlling the data storage apparatus storing data of the given data group; and a second synchronizing unit that, after completion of the synchronization by the first synchronizing unit and when the metadata that is stored in the storing apparatus and represents the attribute information and the storage location information of the data of the given data group, has accumulated in a second cache memory that temporarily accumulates the metadata, synchronizes the metadata accumulated in the second cache memory and the metadata stored in the storing apparatus, by controlling the storing apparatus, wherein the generating unit generates the snapshots of the pluralities of data and generating the snapshot of the metadata, after completion of the synchronization by the second synchronizing unit.

12. The computer according to claim 8, further comprising an erasing unit that erases the attribute information and the storage location information that are included in the snapshot of the metadata and for data that are not in the given data group.

13. A snapshot collection method executed by a computer capable of controlling a plurality of data storage apparatuses respectively storing therein a plurality of data, and a storing apparatus storing therein metadata that includes for each of the data, attribute information and storage location information indicating in which data storage apparatus the respective data is stored, the method comprising:

receiving a snapshot collection request for a given group of the data having specified attribute information;

determining with respect to each of the data storage apparatuses and when the collection request is received, whether any of the data of the given group is stored therein, based on the attribute information and the storage location information of the metadata;

generating, with respect to each of the data storage apparatuses that has been determined to be storing data of the given group, a snapshot of all of the plurality of data stored in the data storage apparatus and including the data of the given group and other data without performing quiesce operation on the other data, by controlling the data storage apparatus and further generating a snapshot of the metadata by controlling the storing apparatus; and setting access permission for only the data of the given group in the snapshot by deleting from the metadata, information indicating location of the other data.

14. The snapshot collection method according to claim 13, further comprising:

suspending access to the data of the given group after the collection request is received, by controlling the data storage apparatuses; and releasing suspension of access to the data of the given group after generation of the snapshot of the data and the snapshot of the metadata, by controlling the data storage apparatuses.

15. The snapshot collection method according to claim 14, wherein the suspending includes suspending access upon completion of any access to the data of the given group in progress before the reception of the collection request.

16. The snapshot collection method according to claim 14, wherein the suspending includes suspending among accesses occurring after the reception of the collection request, only the accesses for updating the data of the given group.

17. The snapshot collection method according to claim 13, further comprising:

first-synchronizing, with respect a data storage apparatus that has been determined to be storing data of the given group, the stored data of the given group and the data of the given group accumulated in a first cache memory that temporarily accumulates the data of the given group stored in the data storage apparatus, the first-synchronizing being performed when the data of the given group has accumulated in the first cache memory and by controlling the data storage apparatus storing data of the given group; and second-synchronizing performed after completion of the first-synchronizing and when the metadata that is stored in the storing apparatus and represents the attribute information and the storage location information of the data of the given group, has accumulated in a second cache memory that temporarily accumulates the metadata, the second-synchronizing synchronizing the metadata accumulated in the second cache memory and the metadata stored in the storing apparatus, by controlling the storing apparatus, wherein the generating includes generating the snapshots of the pluralities of data and generating the snapshot of the metadata, after completion of the second synchronizing.

* * * * *